United States Patent
Nakayama et al.

(10) Patent No.: US 10,707,729 B2
(45) Date of Patent: Jul. 7, 2020

(54) STRUCTURE OF ELECTRICAL CONNECTION PORTION, ROTOR AND MOTOR THAT APPLY SAME STRUCTURE, AND METHOD FOR FORMING ELECTRICAL CONNECTION PORTION

(71) Applicant: MABUCHI MOTOR CO., LTD., Matsudo, Chiba (JP)

(72) Inventors: Shou Nakayama, Matsudo (JP); Yoshiaki Maeda, Matsudo (JP); Takeshi Hirano, Matsudo (JP); Kenji Muneda, Matsudo (JP); Keishirou Maki, Matsudo (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 363 days.

(21) Appl. No.: 15/703,585

(22) Filed: Sep. 13, 2017

(65) Prior Publication Data

US 2018/0026499 A1   Jan. 25, 2018

Related U.S. Application Data

(63) Continuation of application No. PCT/JP2016/087768, filed on Dec. 19, 2016.

(30) Foreign Application Priority Data

Dec. 28, 2015   (JP) .................. 2015-256710

(51) Int. Cl.
*H02K 13/08* (2006.01)
*H02K 15/02* (2006.01)
(Continued)

(52) U.S. Cl.
CPC .......... *H02K 13/08* (2013.01); *H02K 1/2786* (2013.01); *H02K 3/20* (2013.01); *H02K 15/02* (2013.01)

(58) Field of Classification Search
CPC ............ H02K 1/10; H02K 3/18; H02K 5/143; H02K 13/006; H02K 13/04; H02K 13/08
(Continued)

(56) References Cited

U.S. PATENT DOCUMENTS

| 6,774,526 B2 | 8/2004 | Furuya et al. |
| 6,853,108 B2 | 2/2005 | Furuya et al. |

(Continued)

FOREIGN PATENT DOCUMENTS

| CN | 1389967 A | 1/2003 |
| CN | 101299391 A | 11/2008 |

(Continued)

OTHER PUBLICATIONS

International Search Report issued for corresponding International Patent Application No. PCT/JP2016/087768, dated Feb. 14, 2017.

(Continued)

*Primary Examiner* — Quyen P Leung
*Assistant Examiner* — Minki Chang
(74) *Attorney, Agent, or Firm* — Myers Wolin, LLC

(57) ABSTRACT

The present invention is a structure of an electrical connection portion formed by thermal bonding of a terminal 53 of a current-carrying component 50 of a motor and a winding wire 30. The terminal 53 includes a lock portion 53*a* positioned on a base end side and a fusion portion 53*b* positioned on a distal end side. The winding wire 30 includes a binding portion 31 wound around the lock portion 53*a* and has a one end portion 36 coupled to a molten ball 55 generated at the fusion portion 53*b*; and a coupling wire portion 33 tightly stretched from a main winding wire portion 34 of the motor disposed in a wound state and continuous to the other end portion of the binding portion 31. The one end portion 36 of the binding portion 31 is in a (Continued)

state where tension pulling the coupling wire portion 33 to the main winding wire portion 34 side does not act.

18 Claims, 12 Drawing Sheets

(51) Int. Cl.
 *H02K 1/27* (2006.01)
 *H02K 3/20* (2006.01)
(58) Field of Classification Search
 USPC .................. 310/128, 135, 173, 224, 233
 See application file for complete search history.

(56) References Cited

U.S. PATENT DOCUMENTS

| | | | | |
|---|---|---|---|---|
| 2002/0185930 A1* | 12/2002 | Furuya | ................... | H01R 39/32 310/233 |
| 2004/0070292 A1* | 4/2004 | Fujita | ..................... | H02K 3/522 310/71 |
| 2006/0138892 A1* | 6/2006 | Hagino | .................. | H01R 39/32 310/198 |

FOREIGN PATENT DOCUMENTS

| | | |
|---|---|---|
| JP | 4-267026 A | 9/1992 |
| JP | 2003-61314 A | 2/2003 |
| JP | 2006-296023 A | 10/2006 |
| JP | 2008-227298 A | 9/2008 |

OTHER PUBLICATIONS

English translation of the Written Opinion of the International Searching Authority issued for corresponding International Patent Application No. PCT/JP2016/087768, dated Jul. 3, 2018.

Chinese Patent Office Action issued by the China National Intellectual Property Administration for corresponding Chinese Patent Application No. 201680011688.0 dated Nov. 26, 2018 with a computer-generated English Translation.

Notice of Reasons for Refusal issued by the Japan Patent Office for corresponding Japanese Patent Application No. 2017-516792, dated May 12, 2020, with a full English machine translation.

* cited by examiner

LONGITUDINAL DIRECTION
(RADIAL DIRECTION)

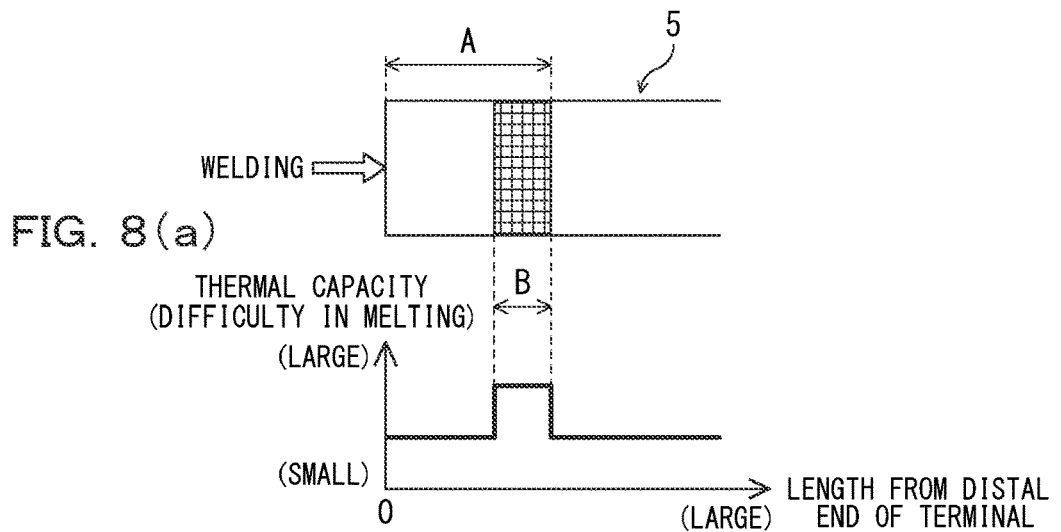
FIG. 8(a)
FIG. 8(b)
FIG. 9
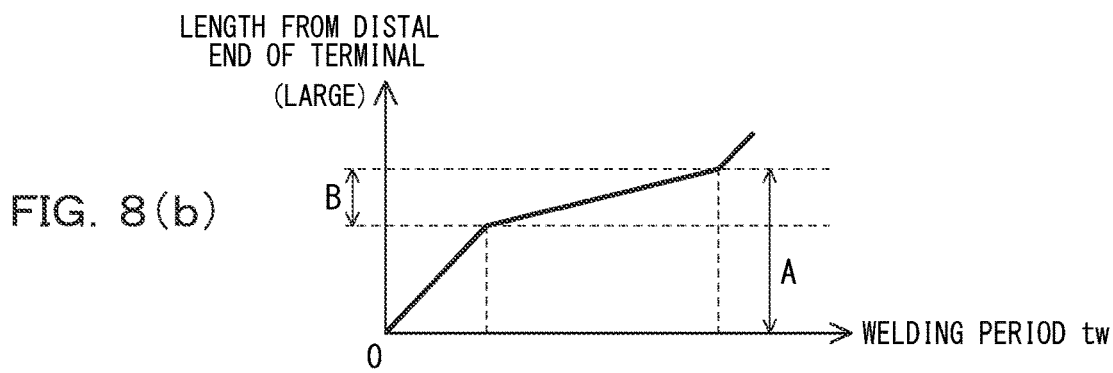

STRUCTURE OF ELECTRICAL CONNECTION PORTION, ROTOR AND MOTOR THAT APPLY SAME STRUCTURE, AND METHOD FOR FORMING ELECTRICAL CONNECTION PORTION

CROSS-REFERENCE TO THE RELATED APPLICATION

This application is a continuation application of International Application PCT/JP2016/087768, filed on Dec. 19, 2016 and designated the U.S., which claims priority to Japanese Patent Application No. 2015-256710, filed Dec. 28, 2015, the entire contents of each are incorporated herein by reference.

TECHNICAL FIELD

The present invention relates to a structure of an electrical connection portion of a terminal of a current-carrying component of a motor and a winding wire, a rotor and a motor that apply this structure, and a method for forming the electrical connection portion.

BACKGROUND ART

Conventionally, as a motor serving as a power source for various devices such as an on-board vehicle electric component and an office machine, a permanent magnet field DC motor has been used. For example, there has been known a motor with brush that includes a rotor around which a winding wire is wound is rotatably journaled to a stator to which a permanent magnet is fixed. This motor switches a direction of a current flowing through the winding wire using the brush on the stator side and a commutator on the rotor side to rotate the rotor.

A terminal of the commutator and an end portion of the winding wire are welded by thermal bonding (a bonding process using heat) such as a soldering and welding or are fixedly secured by fusing for electrical connection. Among motors that include a varistor, which absorbs a surge voltage causing an electrical noise, mounted to a commutator, there has been provided a motor with a terminal of the commutator and an end portion of a winding wire welded integrally with a metal terminal of the varistor (for example, Patent Document 1).
Patent Document 1: JP-A-2006-296023

DISCLOSURE OF THE INVENTION

Problems to be Solved by the Invention

Generally, to electrically connect the terminal of the commutator and the end portion of the winding wire by the thermal bonding, after the winding wire is bound to be locked to the terminal, the welding, the soldering, or the like is performed from the distal end side of the terminal. At this time, since the winding wire is wound around a rotor core or the like at a predetermined tension (so-called winding wire tension), tensile force heading for the rotor core or the like acts on the end portion side of the winding wire bound to the terminal. When the end portion of the winding wire locked to the terminal in this state is motionless without looseness, a force attempting to stay on the terminal at a force equal to or more than the above-described tensile force acts on the end portion of the winding wire. That is, with the winding wire bound to be locked to the terminal, the tensile force and the force attempting to stay on the place act on the end portion side of the winding wire. If the heat during the thermal bonding is added here and the latter force becomes smaller than the former force, this results in disconnection of the winding wire.

The following is considered for the problem to prevent the disconnection during the thermal bonding. For example, a means to hold a state in which the tensile force does not act on the end portion side of the winding wire during the thermal bonding is disposed. Thus, the tensile force is reduced as much as possible during the thermal bonding. However, with this method, after removal of the holding means, the above-described tensile force always acts on the winding wire positioned on a root of a molten ball generated on the terminal by the thermal bonding. This possibly causes disconnection at this root part due to secular change. Especially, the smaller the motor size and the thinner the wire diameter of the winding wire, the larger an influence of the tensile force to the root part, increasing a possibly of disconnection.

The present application has been invented in consideration of these problems. The one object is to provide a structure of an electrical connection portion that ensures preventing disconnection after thermal bonding of a terminal of a current-carrying component of a motor and a winding wire, a method for forming the electrical connection portion, and a rotor and a motor that apply a structure of this electrical connection portion. It should be noted that, the present invention is not limited to this object, and to exhibit an operational effect led by each configuration described in Description of Preferred Embodiments described later. An operational effect that cannot be obtained by the conventional technique can also be served as another object of the present application.

Solutions to the Problems (1) A structure of an electrical connection portion disclosed here is a structure of an electrical connection portion formed by thermal bonding of a terminal of a current-carrying component of a motor and a winding wire. The terminal includes a lock portion positioned on a base end side and a fusion portion positioned on a distal end side. The winding wire includes a binding portion and a coupling wire portion. The binding portion is wound around the lock portion. The binding portion has one end portion coupled to a molten ball generated at the fusion portion. The coupling wire portion is tightly stretched from a main winding wire portion of the motor disposed in a wound state and continuous to the other end portion of the binding portion. The one end portion of the binding portion is in a state where tension pulling the coupling wire portion to the main winding wire portion side does not act.

(2) The following is preferable. The binding portion after the thermal bonding is in a state of acting a bearing power to retain the wound state to the lock portion. The bearing power is larger than the tension.

(3) The following is preferable. The terminal includes a partition portion. The partition portion partitions the lock portion and the fusion portion. The partition portion maintains the state of the bearing power being larger than the tension.

(4) The following is preferable. The molten ball is generated by a restriction of a progress by the partition portion during the thermal bonding of the winding wire from a distal end side of the terminal.

(5) The following is preferable. The partition portion has a lateral cross-sectional area larger than the lock portion.

(6) The following is preferable. The partition portion includes a wide-width portion with a width formed wider than the lock portion.

(7) The following is preferable. The partition portion includes a wall thickness portion formed thicker than the lock portion.

(8) The following is preferable. The fusion portion includes a cut-out portion to configure a lateral cross-sectional area smaller than the partition portion.

(9) The following is preferable. The partition portion includes a different-material portion. The different-material portion is made of a material with a property of being less likely to melt compared with a material of the molten ball.

(10) The following is preferable. The terminal includes the lock portion, the partition portion, and the fusion portion in an order from the base end side. The binding portion includes a crossing wire portion obliquely crossing the partition portion. The crossing wire portion is disposed such that a count of wires along one surface of the terminal on the main winding wire portion side is less than the count of wires along the other surface on a side opposite to the one surface.

(11) The following is preferable. The current-carrying component includes a conductive plate around which the winding wire is wound together with a core of the motor. The crossing wire portion is disposed only on the other surface side of the terminal of the conductive plate.

(12) The following is preferable. The molten ball is positioned on the other surface side of the terminal.

(13) The following is preferable. The current-carrying component includes the conductive plate around which the winding wire is wound together with the core of the motor. In the coupling wire portion, both end portions of the coupling wire portion are positioned on a side identical to one another in a width direction perpendicular to a longitudinal direction connecting the base end side and the distal end side at the terminal of the conductive plate.

(14) The following is preferable. The winding wire has a distal end positioned at the fusion portion.

(15) The following is preferable. The winding wire is wound without an overlap with the fusion portion.

(16) The following is preferable. The fusion portion is made of the material with a melting point lower than a material of the winding wire.

(17) The following is preferable. The material of the fusion portion is a phosphor bronze. The material of the winding wire is an oxygen free copper.

(18) In a rotor disclosed here, the terminal of the current-carrying component and the winding wire are coupled with the structure of the electrical connection portion according to any one of (1) to (17).

(19) In a motor disclosed here, the terminal of the current-carrying component and the winding wire are coupled with the structure of the electrical connection portion according to any one of (1) to (17).

(20) A method for forming a first electrical connection portion disclosed here is a method for forming an electrical connection portion of a terminal of a current-carrying component and a winding wire. The current-carrying component includes the terminal with a lock portion on a base end side and a fusion portion on a distal end side. The terminal is thermally bonded to the winding wire of a motor. The method includes a winding step and a bonding step. The winding step disposes a main winding wire portion, a first winding wire portion, and a second winding wire portion of the motor. The winding wire is in a wound state at the main winding wire portion. The winding wire is wound around the lock portion via a coupling wire portion with the main winding wire portion at the first winding wire portion. The winding wire is wound around the fusion portion continuous with the first winding wire portion at the second winding wire portion. The bonding step melts the fusion portion to thermally bond the fusion portion to the second winding wire portion concurrently with or after the winding step. The winding step winds the winding wire such that a bearing power of the first winding wire portion to the lock portion becomes larger than a force pulling the coupling wire portion to the main winding wire portion side. The bonding step terminates the thermal bonding maintaining a state of the bearing power being larger than the tension.

(21) A method for forming a second electrical connection portion disclosed here is a method for forming an electrical connection portion of a terminal of a current-carrying component of a motor and a winding wire. The method includes a shaping step, a winding step, and a bonding step. The shaping step configures a base end side of the terminal as a lock portion, a distal end side as a fusion portion, and a base end side with respect to the fusion portion as a difficult-to-melt portion less likely to melt compared with the fusion portion to shape the terminal into a predetermined shape. The winding step disposes a main winding wire portion, a first winding wire portion, and a second winding wire portion of the motor after the shaping step. The winding wire is in a wound state at the main winding wire portion. The winding wire is wound around the lock portion via a coupling wire portion tightly stretched between the main winding wire portion and the first winding wire portion at the first winding wire portion. The winding wire is wound around the fusion portion continuous with the first winding wire portion at the second winding wire portion. The bonding step melts the fusion portion to thermally bond the fusion portion to the second winding wire portion concurrently with or after the winding step.

Effects of the Invention

With the structure and the method for forming the electrical connection portion of the disclosure, since a tension acting on the coupling wire portion does not act on the one end portion of the binding portion (first winding wire portion), stress caused by winding wire tension is not applied. This ensures preventing the disconnection at the one end portion due to secular change. Even when vibrations are applied to the electrical connection portion, the tension does not act on the one end portion, thereby also ensuring preventing the disconnection due to the vibrations.

BRIEF DESCRIPTION OF THE DRAWINGS

FIG. 6(a) illustrates the conductive plate terminal before welding, and FIG. 6(b) illustrates the conductive plate terminal after the welding.

FIG. 7(a) illustrates a state before the welding, and FIG. 7(b) illustrates a state after the welding.

FIG. 8(a) is a drawing to describe a position of a difficult-to-melt portion, and FIG. 8(b) is a graph describing an action of the difficult-to-melt portion.

FIG. 9 is a flowchart showing an example of a method for manufacturing the rotor including a method for forming the coupling portion according to the embodiment.

FIG. 12(a) is a drawing viewed from an axial direction, and FIG. 12(b) is a drawing viewed from a radial direction.

DESCRIPTION OF PREFERRED EMBODIMENTS

With reference to the drawings, the following describes a structure of an electrical connection portion as an embodiment, a rotor and a motor that apply this structure, and a method for forming the electrical connection portion. The embodiment described later is merely illustrative and has no intention of eliminating application of various modifications and techniques that are not clearly specified in the following embodiment. Each configuration of the embodiment can be implemented while various modifications are made thereto within a scope that does not depart from the gist thereof, can selectively be employed or eliminated upon necessary, or can appropriately be combined.

This embodiment describes a DC motor with brush as an example, describes the structure of the coupling portion that electrically connects a terminal of a current-carrying component constituting a rotor of this motor and a winding wire by thermal bonding, and also describes a structure of the coupling portion electrically connected by the thermal bonding. This embodiment describes a Y-connection method (circuit by Y-connection) as an example of a winding method (circuit configuration) of the wire winding. That is, the rotor of this embodiment includes the winding wire coupled by the Y-connection method, a commutator to which one end of this winding wire is coupled, and a conductive plate to which the other end of the winding wire is coupled.

The above-described current-carrying components include the commutator and the conductive plate. This embodiment exemplifies the case where the coupling portions of the terminal of the commutator and the winding wire are bonded together by soldering and the coupling portions of the terminal of the conductive plate and the winding wire are bonded by welding. The following description describes respective configurations of the motor and the rotor and describes coupling structures of the coupling portions of the respective terminals of the commutator and the conductive plate as the current-carrying components and the winding wire. The following describes the method for forming the coupling portion.

[1. Overall Configuration]

Figure 1:
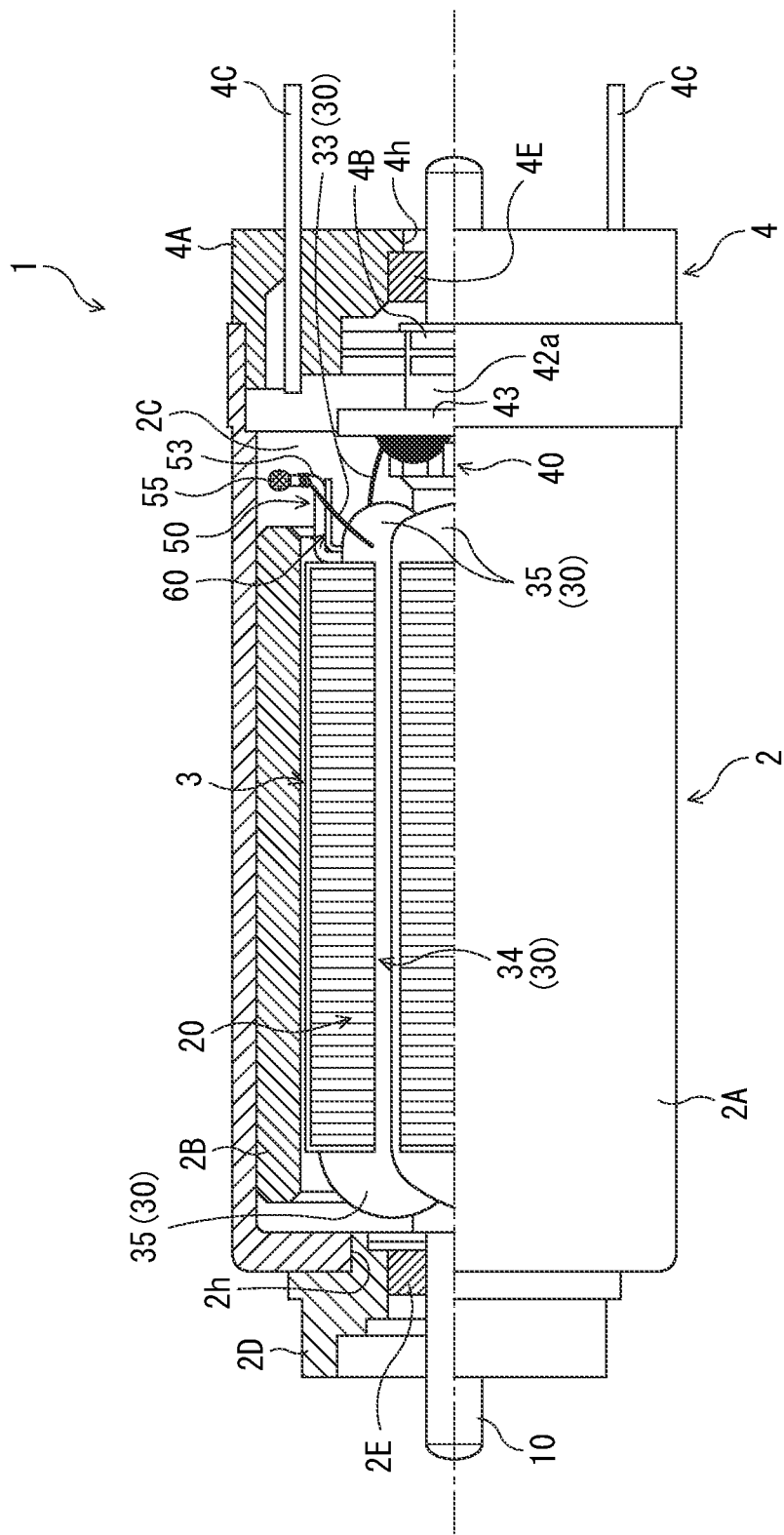
FIG. 1 is a half axial cross-sectional view of a motor that includes a rotor applying a structure of an electrical connection portion according to an embodiment.

FIG. 1 is a half axial cross-sectional view of a DC motor 1 (hereinafter referred to as "a motor 1") of the embodiment. The motor 1 is a permanent magnet field DC motor with brush and includes a stator 2, a rotor 3, and an end bell 4.

The stator 2 includes a housing 2A formed into a cylindrical shape with a closed bottom and a permanent magnet 2B fixed along an inner peripheral surface of the housing 2A. The permanent magnet 2B is opposed to a core 20 of the rotor 3 in the assembled state and axially extends so as to surround the core 20. One end and the other end of the permanent magnet 2B of this embodiment in the axial direction are both disposed at positions exceeding corresponding one end and other end of the core 20. The housing 2A has a space 2C between an end surface of the permanent magnet 2B on the end bell 4 side and the end bell 4. A circular hole portion 2h is passed through a center bottom portion of the housing 2A. A bearing holder 2D is internally fitted to this hole portion 2h. The bearing holder 2D includes a bearing 2E to rotatably support one end of a shaft 10 of the rotor 3.

The end bell 4 includes a main body 4A fixed to an opening on the housing 2A, a brush 4B held to the main body 4A, and two terminating portions 4C to supply the motor 1 with electric power. The brush 4B, which is a component slidably contacting brush contact portions 42a of a commutator 40 described later, is supported by a brush base (not illustrated) and is coupled to the terminating portion 4C. The terminating portions 4C are fixed to the main body 4A so as to project to an outside of the housing 2A with the end bell 4 fixed to the housing 2A. A circular hole portion 4h is passed through a center of the main body 4A. A bearing 4E, which rotatably supports the other end of the shaft 10, is internally fitted to this hole portion 4h.

The rotor 3 includes the core 20 rotated integrally with the shaft 10, the commutator 40 fixed to the shaft 10, and a conductive plate 50. The shaft 10 is a rotation shaft to support the rotor 3 and also functions as an output shaft that takes out an output from the motor 1 to the outside. The core 20 is a stacked core formed by stacking a plurality of steel plates with identical shape. The shaft 10 is fixed to the center of the core 20 with the axial directions matched in the stacking direction of the steel plates. Furthermore, a winding wire 30 coupled by the Y-connection method is wound around the core 20.

Figure 2:
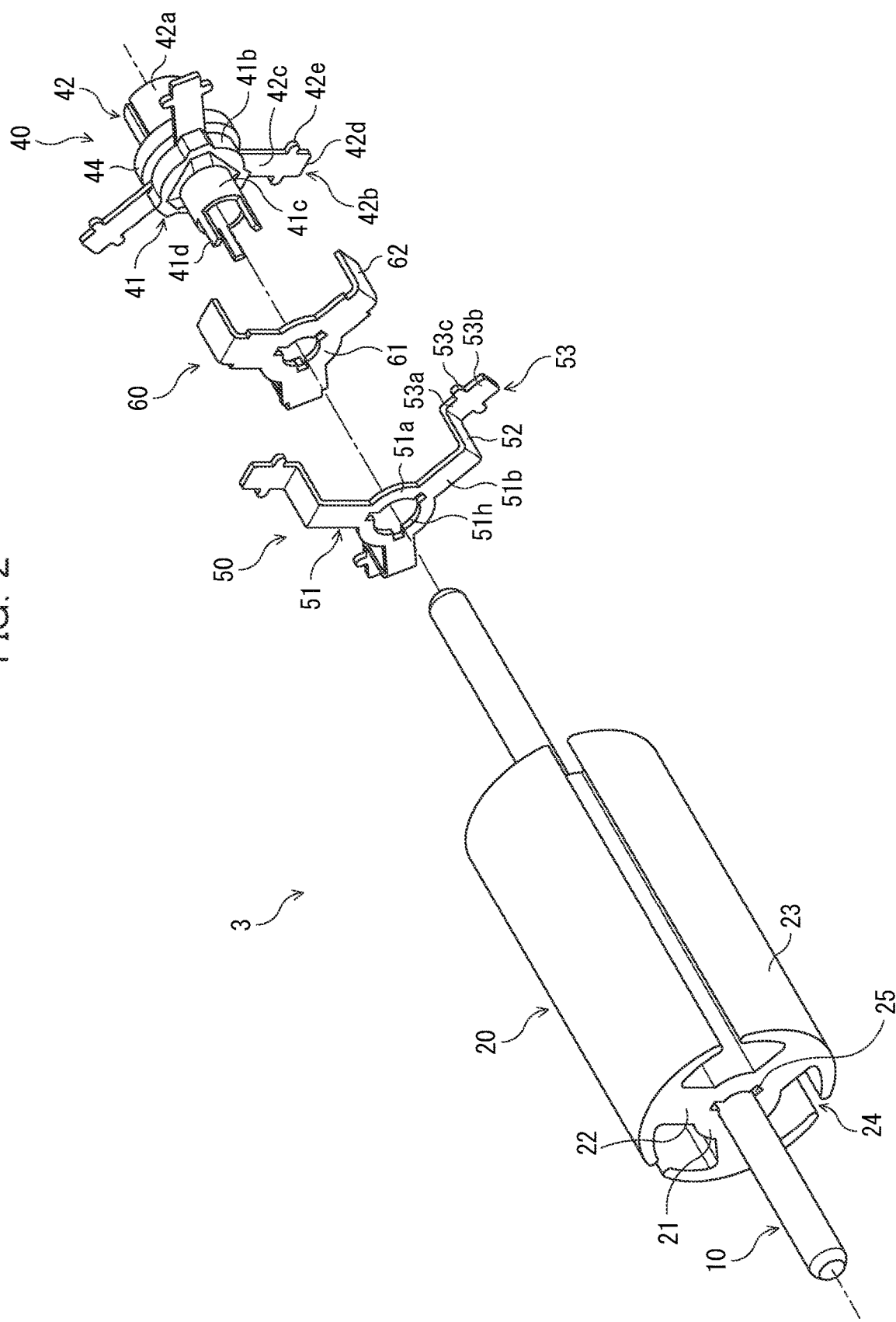
FIG. 2 is an exploded perspective view illustrating a state of the rotor in FIG. 1 before connection.
Figure 3A:
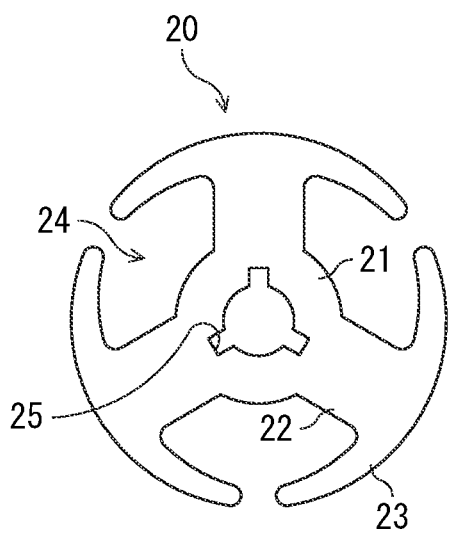
FIG. 3(a) is a drawing viewing a core from an axial direction.

As illustrated in FIGS. 2 and 3(a), the core 20 of this embodiment has an outer shape with three-fold rotational symmetry. Specifically, the core 20 includes a center portion 21, three teeth 22, and three arc portions 23. The shaft 10 is inserted through the center portion 21, and the center portion 21 has three key grooves 25. The teeth 22 radially extend from the center portion 21 to radially outside. The arc portions 23 are disposed isolated from one another in a circumferential direction on outer end portions of the respective teeth 22. Slots 24 are formed surrounded by the arc portions 23 positioned on the distal end side of the respective teeth 22. These slots 24 are grooves extending in the axial direction of the core 20 and are formed by three at regular intervals in the circumferential direction of the core 20. The winding wire 30 is wound around the teeth 22 of the core 20 by a predetermined number of turns through the slots 24 on both sides of the teeth 22. An insulating layer (not illustrated) is coated on a part of the core 20 around which the winding wire 30 is wound, thus holding an insulating property.

Figure 4:
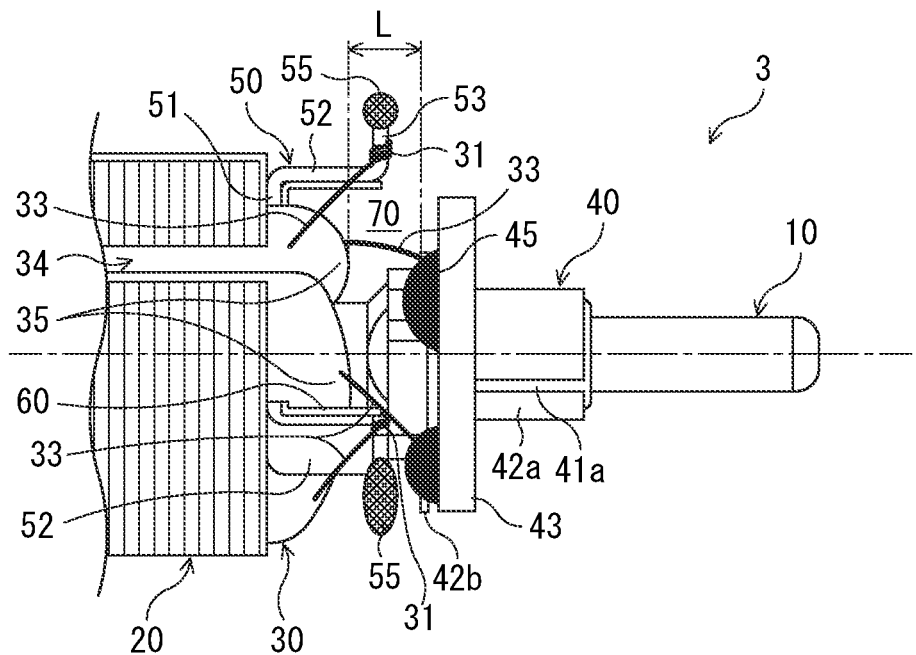
FIG. 4 is a partial side view illustrating a state after the connection of the rotor in FIG. 1 and after welding to the conductive plate.

As illustrated in FIG. 4, the winding wire 30 is an insulating electric wire that generates a magnetic force through a flow of a current. A material of the winding wire 30 of this embodiment is a high purity copper (oxygen free copper) and is an enamel copper wire covered with a film such as a polyurethane. The winding wire 30 may be formed of a material other than the high purity copper (for example, a metal other than a phosphor bronze, a copper alloy, and a copper). The winding wire 30 wound around the respective teeth 22 on the core 20 is coupled by the Y-connection method. That is, after the one end of the winding wire 30 is coupled to one of three terminals 42b (hereinafter referred to as "commutator terminals 42b"), which will be described later, of the commutator 40, the winding wire 30 is wound around one of the three teeth 22 on the core 20. Additionally, the other end is coupled to one corresponding terminal 53 (hereinafter referred to as "a conductive plate terminal 53"), which will be described later, among the three terminals 53 of the conductive plate 50. For example, performing this process on the respective teeth 22 by a winding device ensures forming the rotor 3 by the Y-connection method. Hereinafter, the winding wire 30 wound around the core 20 is referred to as a main winding wire portion 34 and a part bulging from an end surface of the core 20 in the main winding wire portion 34 (a part bulging like a mountain) is referred to as a wound mountain 35. That is, the main winding wire portion 34 is a part of the winding wire 30 in the wound state generating a magnetic force.

Figure 3B:
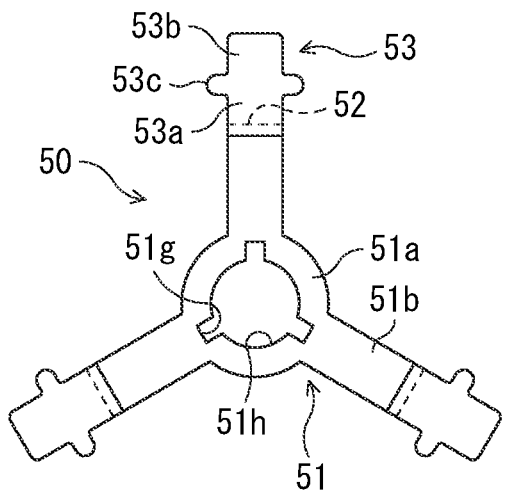
FIG. 3(b) is a drawing viewing a conductive plate from the axial direction.
Figure 3C:
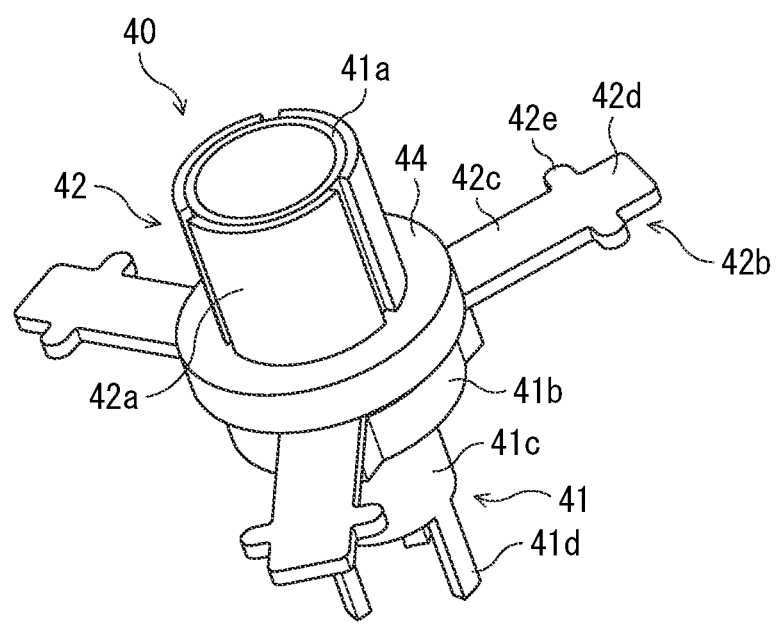
FIG. 3(c) is a perspective view of a commutator among components constituting the rotor in FIG. 1.
Figure 5:
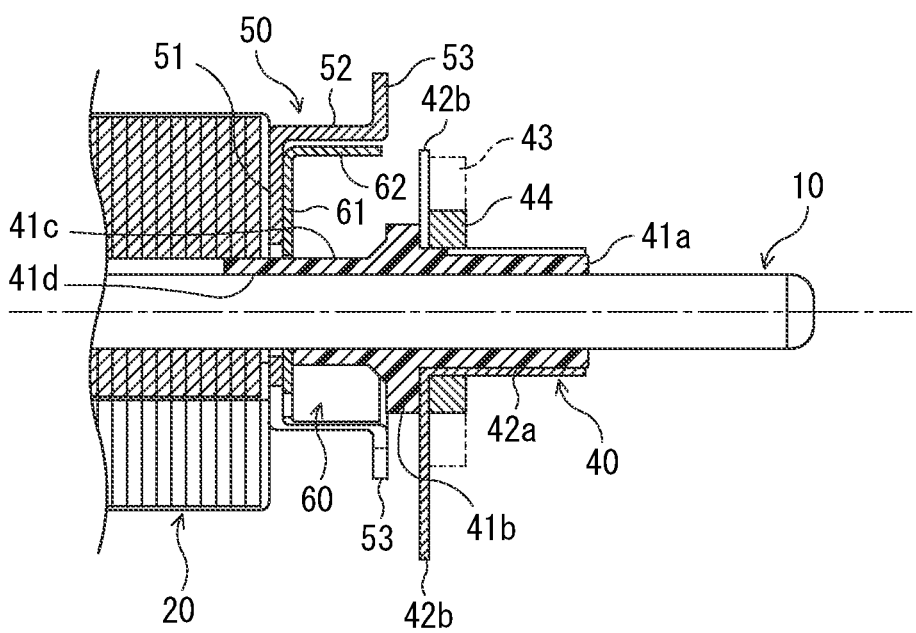
FIG. 5 is an axial cross-sectional view illustrating a state before the rotor in FIG. 4 is connected.

As illustrated in FIGS. 2 and 3(c), the commutator 40 includes a support body 41 and three metallic commutator pieces 42. The support body 41 is fixed to the shaft 10 and is a tubular insulating component made of resin. A material of the commutator piece 42 of this embodiment is a high purity copper (oxygen free copper). It is only necessary that the commutator piece 42 is made of the material with a melting point at least higher than that of a brazing material (for example, a solder). For example, the commutator piece 42 may be made of a metallic material other than a phosphor bronze, a copper alloy, and a copper (such as a gold and an argentum). As illustrated in FIG. 5, the commutator 40 of this embodiment includes a varistor 43, which absorbs a surge voltage causing an electrical noise, mounted on an outer peripheral side of a pressing member 44.

The support body 41 in the commutator 40 includes a first cylinder portion 41a to which the commutator pieces 42 are mounted, an intermediate portion 41b with a diameter larger than that of the first cylinder portion 41a, a second cylinder portion 41c disposed on a side opposite to the first cylinder portion 41a interposing the intermediate portion 41b, and three foot portions 41d (insulating portions) axially projecting from the second cylinder portion 41c. The wound mountains 35 are positioned around the second cylinder portion 41c (see FIGS. 1 and 4). The foot portions 41d are projections projected from an annular edge of the second cylinder portion 41c and are disposed at regular intervals in the circumferential direction. The foot portions 41d restrict a position of the conductive plate 50 with respect to the shaft 10 in the circumferential direction and the radial direction and function so as to insulate between the conductive plate 50 and the shaft 10.

The commutator piece 42 includes the brush contact portions 42a with which the brush 4B slidably contacts and the commutator terminal 42b to which the winding wire 30 is coupled. The brush contact portion 42a has a shape of a cylinder divided into three, and the inner peripheral surface contacts an outer peripheral surface of the first cylinder portion 41a of the support body 41 by the surface. The commutator pieces 42 are fixed to the support body 41 by mounting the annular pressing member 44 with the inner peripheral surfaces of the brush contact portions 42a contacting the outer peripheral surface of the first cylinder portion 41a by the surface.

The commutator terminal 42b is a flat plate-shaped site projecting from an arc-shaped end portion of the brush contact portion 42a to radially outside. After the winding wire 30 is wound several times and locked (hooked), the commutator terminals 42b are bonded by thermal bonding (a bonding process using heat) such as welding and soldering. The commutator terminals 42b of this embodiment are bonded to the winding wire 30 by the soldering. Black sites 45 in FIG. 4 denote solders. The material of the commutator terminal 42b of this embodiment is the high purity copper (oxygen free copper).

The commutator terminal 42b includes a lock portion 42c, which is positioned on a base end side in a longitudinal direction (radial direction), a fusion portion 42d positioned on a distal end side, and a wide-width portion 42e disposed between the lock portion 42c and the fusion portion 42d. That is, the commutator terminal 42b includes the lock portion 42c, the wide-width portion 42e, and the fusion portion 42d in an order from radially inside to outside. A coupling structure of the commutator terminal 42b including a specific shape [the structure of the coupling portion of the commutator terminal 42b and the winding wire 30] will be described later.

The conductive plate 50 is a metallic plate-shaped component forming an electrically neutral point. As illustrated in FIGS. 1 and 5, the conductive plate 50 is fitted onto the shaft 10 via the foot portions 41d of the commutator 40 between the commutator terminals 42b of the commutator 40 and the core 20. The conductive plate terminal 53 of the conductive plate 50 coupled to the winding wire 30 is positioned on the end bell 4 side with respect to the wound mountains 35 of the winding wire 30 wound around the core 20 and is positioned on the core 20 side with respect to the commutator terminal 42b. That is, the conductive plate 50 is configured such that the axial direction position is at an intermediate portion 70 of the wound mountains 35 and the commutator terminal 42b to separate the conductive plate terminal 53 from both the wound mountains 35 and the commutator terminal 42b. This avoids interference between the conductive plate terminal 53 and the brush 4B, and the heat when the conductive plate terminal 53 is thermally bonded with the winding wire 30 is less likely to transmit to the winding wire 30.

As illustrated in FIGS. 2 and 3(b), the conductive plate 50 has an outer shape with three-fold rotational symmetry. Specifically, the conductive plate 50 includes a plane surface 51, which has a through-hole 51h for shaft insertion at the center, the three conductive plate terminals 53, which are disposed radially outside with respect to the plane surface 51, and standing walls 52 continuously disposed between the plane surface 51 and the conductive plate terminals 53. The conductive plate 50 of this embodiment is formed of a single plate made of the high purity copper (oxygen free copper). The material of the conductive plate 50 is not limited to the high purity copper (oxygen free copper) but may be, for example, the metal other than the phosphor bronze, the copper alloy, and the copper (for example, the gold and the argentum). It is only necessary that the conductive plate 50 is made of the material with a melting point at least higher than that of the brazing material (for example, the solder).

The plane surface 51 is a site forming the electrically neutral point and includes an annular portion 51a through which the shaft 10 is inserted and three extending portions 51b radially extending from the annular portion 51a to radially outside. The standing walls 52 and conductive plate terminals 53 are disposed on the extended lines radially extending the respective three extending portions 51b. The through-hole 51h at the center of the annular portion 51a has an inner diameter slightly larger than an outer diameter of the shaft 10. The through-hole 51h further includes concave portions 51g with which the foot portions 41d of the support body 41 of the commutator 40 are engaged. This makes the conductive plate 50 contactless to the shaft 10 and restricts the circumferential and radial direction positions of the conductive plate 50 with respect to the shaft 10 via the foot portions 41d. The foot portions 41d also engage with the key grooves 25 on the core 20.

The standing wall 52 is a site to specify the axial direction position of the conductive plate terminal 53. The standing walls 52 extend (are disposed upright) from end portions radially outside of the extending portions 51b of the plane surface 51 to a direction intersecting with the plane surface 51. As illustrated in FIGS. 2 to 5, the plane surface 51 on the conductive plate 50 of this embodiment is placed on an end surface of the core 20 via an insulating layer. That is, in the conductive plate 50, the extending portions 51b are placed on the teeth 22 of the core 20. The winding wire 30 is wound around the plane surface 51 together with the teeth 22. Since the standing walls 52 specify the positions of the conductive plate terminals 53 when the plane surface 51 is placed on the end surface of the core 20, making the positioning of the conductive plate 50 easy.

The conductive plate terminal 53 is a flat plate-shaped site projecting radially outside from an end portion on a side opposite to the extending portion 51b of the standing wall 52 (the end portion in the extending direction). After the winding wire 30 is wound several times and is locked (hooked), the conductive plate terminal 53 is bonded by the thermal bonding such as the welding and the soldering. The conductive plate terminal 53 of this embodiment is made of the high purity copper (oxygen free copper) and is bonded with the winding wire 30 by TIG welding. A site 55 with mesh pattern in FIGS. 1, 4, and 6(b) indicates a molten ball generated by melting and hardening the conductive plate terminal 53. A kind of the welding is not limited to the TIG welding but another arc welding may be employed. A coupling structure of the conductive plate terminal 53 including a specific shape [the structure of the coupling portion of the conductive plate terminal 53 and the winding wire 30] will be described later.

In the assembled state of the conductive plate 50 fitted onto the shaft 10, the conductive plate terminals 53 of this embodiment project from the standing walls 52 to the outside so as to be perpendicular to the axial direction of the shaft 10. This easily targets the conductive plate terminal 53 for thermal bonding of the winding wire 30 to the conductive plate terminal 53, improving work efficiency for bonding. By disposing the conductive plate terminal 53 in the direction perpendicular to the axial direction, it is only necessary to move a welding electrode during the bonding only in the direction perpendicular to the axial direction, facilitating a control of manufacturing equipment. Furthermore, projecting the conductive plate terminal 53 in the direction perpendicular to the axial direction of the shaft 10 makes a distance from the wound mountains 35 far. Accordingly, the heat during the bonding is less likely to transmit to the winding wire 30.

The standing walls 52 of this embodiment are disposed upright from the plane surface 51 bent in the vertical direction and are parallel to the axial direction of the shaft 10. Accordingly, the conductive plate terminals 53 project in the direction perpendicular to the standing walls 52. Thus extending the standing walls 52 in the direction perpendicular to the plane surface 51 minimizes a length of the standing walls 52 necessary to dispose the conductive plate terminals 53 at the predetermined positions.

The conductive plate terminal 53 is disposed at a central area in the axial direction of the intermediate portion 70 between the wound mountains 35 and the commutator terminal 42b. This is because of advantages in that, the farther the conductive plate terminal 53 from the wound mountains 35 is, the smaller the influence of the heat transmitted to the winding wire 30, and the closer the conductive plate terminal 53 to the wound mountains 35 is, the easier the winding wire 30 is wound around. That is, configuring the axial direction position of the conductive plate terminal 53 at the central area of the intermediate portion 70 restrains the transmission of heat during the bonding and secures easiness of the winding work to the core 20. Here, the central area does not strictly mean the center of an axial length L of the intermediate portion 70 but means a predetermined width including the center. That is, with the plane surface 51 placed on the end surface of the core 20, the height (axial length) of the standing wall 52 is configured such that the conductive plate terminal 53 of the conductive plate 50 is positioned in the central area where the conductive plate terminal 53 has the approximately identical distance to the wound mountain 35 and the commutator terminal 42b.

That is, the conductive plate terminals 53 are disposed such that the distal ends are positioned radially outside with respect to the outer peripheral surface of the core 20 and are isolated from the wound mountains 35. This causes the heat during the bonding to be further less likely to transmit to the winding wire 30. The winding wire 30 can be wound around only radially inside with respect to the standing walls 52 of the conductive plate 50. In contrast to this, projecting the conductive plate terminals 53 radially outside with respect to the outer peripheral surface of the core 20 configures the radial position of the standing walls 52 relatively equivalent to the position of the outer peripheral surface of the core 20, widening the space in which the winding wire 30 can be wound around (radial length). That is, since the radial length of the extending portions 51b of the plane surface 51 is equivalent to the radial length of the teeth 22, the width of the winding wire 30 capable of being wound around the core 20 (radial length) is not limited by the conductive plate 50.

Although the longitudinal direction length of the conductive plate terminal 53 possibly changes before and after the welding, the conductive plate terminal 53 preferably projects radially outside with respect to the outer peripheral surface of the core 20 before and after the welding. As illustrated in FIG. 1, the conductive plate terminals 53 are disposed in the space 2C in the housing 2A with the rotor 3 assembled to the stator 2. At this time, the conductive plate terminals 53 do not contact the inner peripheral surface of the housing 2A. In other words, with the rotor 3 assembled to the stator 2 (that is, with the shape after the welding), the conductive plate 50 has the shape so as not to contact the inner peripheral surface of the housing 2A.

Since the winding wire 30 is wound around the conductive plate 50 of this embodiment together with the core 20, the conductive plate 50 is insulated with respect to the winding wire 30. Specifically, as illustrated in FIGS. 2, 4, and 5, an insulator 60 is disposed contacting the surface of the conductive plate 50 facing the shaft distal end side (the surface on the side opposite to the core 20). The insulator 60 is an insulating component having an outer shape with three-fold rotational symmetry. The insulator 60 of this embodiment includes an insulating plane surface 61, which is placed on a surface on the side opposite to the insulating layer of the plane surface 51, and insulating standing walls 62, which extend along the internal surfaces (surfaces facing radially inside) of the standing walls 52. The insulator 60 of this embodiment is made of a material with high heat-resistant grade.

The insulating plane surface 61 includes an annular portion, which is slightly larger than the annular portion 51a of the plane surface 51 of the conductive plate 50 in the radial direction and the circumferential direction, and three extending portions radially extending from the annular portion to radially outside. The insulating standing wall 62 is formed to have the shape slightly larger than the standing wall 52 of the conductive plate 50 in the circumferential direction. The axial length is formed into a length from the plane surface 51 of the conductive plate 50 reaching to the conductive plate terminal 53. This secures the insulating property of the conductive plate 50 with the winding wire 30. Furthermore, the insulating standing wall 62 is disposed upright between the conductive plate terminal 53 of the conductive plate 50 and the wound mountains 35. Accordingly, the insulator 60 cuts off the transmission of the heat during the bonding. In other words, the insulator 60 also functions as a heat shield plate.

[2. Structure of Coupling Portion]

Figure 6A:
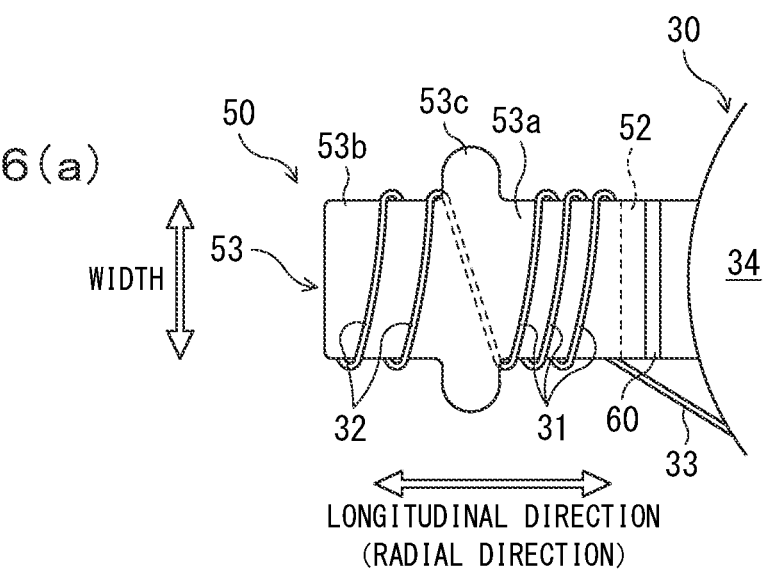
FIGS. 6(a) and 6(b) are schematic diagrams of a conductive plate terminal that applies the structure of the electrical connection portion according to the embodiment.
Figure 6B:
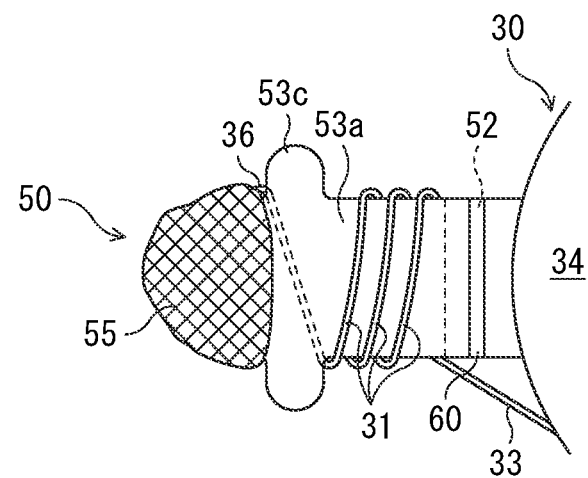

The following describes the structure of the coupling portion (coupling structure) of the conductive plate terminal 53 with the winding wire 30 describing the specific shape of the conductive plate terminal 53 together. FIGS. 6(a) and 6(b) are schematic diagrams enlarging the conductive plate terminal 53, FIG. 6(a) illustrates the shape before the welding, and FIG. 6(b) illustrates the shape after the welding. These drawings are drawings viewing the conductive plate terminal 53 from the axial direction (in the thickness direction of the conductive plate terminal 53). In this embodiment, the commutator terminal 42b, which is coupled to the one end of the winding wire 30, is formed to have the shape similar to the conductive plate terminal 53 and has a function similar to the conductive plate terminal 53. Therefore, the following briefly describes the structure of the coupling portion of the commutator terminal 42b with the winding wire 30 after the explanation of the conductive plate terminal 53.

As illustrated in FIG. 6(a), the conductive plate terminal 53 before the welding includes a lock portion 53a, which is positioned on the base end side in the longitudinal direction (radial direction), a fusion portion 53b, which is positioned on the distal end side, and a wide-width portion 53c (partition portion), which is disposed between the lock portion 53a and the fusion portion 53b.

In this coupling structure, the lock portion 53a and the fusion portion 53b have a width and a thickness identical to one another and both of the lock portion 53a and the fusion portion 53b are sites around which the winding wire 30 is wound several times. Note that, the welding is performed on the fusion portions 53b; therefore, the binding state of the winding wire 30 at the lock portions 53a does not change between before and after the welding. That is, the winding wire 30 wound around the fusion portion 53b (hereinafter referred to as "a second winding wire portion 32") is disposed as a heat bonded portion thermally bonded to the conductive plate terminal 53. The winding wire 30 wound around the lock portions 53a (hereinafter referred to as "a first winding wire portion 31") is disposed as a non-heat bonded portion not thermally bonded to the conductive plate terminal 53. The first winding wire portion 31 (binding portion) is a part of the winding wire 30 disposed via a coupling wire portion 33 in a state of acting tension (a coupling tension F1 described later) with the main winding wire portion 34. The second winding wire portion 32 is a part of the winding wire 30 disposed continuous with the first winding wire portion 31. That is, the coupling wire portion 33 is a part of the winding wire 30 tightly stretched from the main winding wire portion 34 and continuous with the other end portion of the first winding wire portion 31.

The winding wire 30 is wound around the lock portion 53a several times at a predetermined tension (so-called hook tension) via the coupling wire portion 33 in the state of acting the tension (coupling tension F1) approximately identical to the tension (so-called winding wire tension) of the main winding wire portion 34 wound around the core 20. This lock portion 53a has a function of locking the winding wire 30 to the conductive plate terminal 53 before and after the welding. The winding wire 30 is continuously wound around the fusion portion 53b several times from the first winding wire portion 31 at the tension approximately identical to that of the first winding wire portion 31. The fusion portion 53b is a part melting together with the winding wire 30 during the welding, generating a molten ball 55 as illustrated in FIG. 6(b), and having a function of electrical connection through the welding of the conductive plate terminal 53 and the winding wire 30.

The wide-width portion 53c is a site positioned between the lock portion 53a and the fusion portion 53b to partition the lock portion 53a and the fusion portion 53b and formed with a width wider than the lock portion 53a and the fusion portion 53b (so as to widen the width). That is, the wide-width portion 53c has a lateral cross-sectional area (a cross-sectional area taken along a direction perpendicular to the longitudinal direction) larger than the lock portion 53a and the fusion portion 53b. Accordingly, the wide-width portion 53c increases a thermal capacity compared with the other sites 53a and 53b in the conductive plate terminal 53, thereby functioning as a difficult-to-melt portion, which has a property of being less likely to melt compared with the fusion portion 53b, on the base end side with respect to the fusion portion 53b.

The wide-width portion 53c of this embodiment has an oval-like shape viewed from the axial direction and a thickness identical to the lock portion 53a and the fusion portion 53b. The entire shape of the conductive plate terminal 53 is a cross shape viewed from the axial direction. The wide-width portion 53c may be formed to have a rectangular shape, an elliptical shape, a triangular shape, and the like. The winding wire 30 is not wound around the wide-width portion 53c but is disposed to obliquely cross the wide-width portion 53c.

The wide-width portion 53c (difficult-to-melt portion) is a site to decrease a melting rate during the welding and delays a progress of the molten ball 55 when the conductive plate terminal 53 is welded from the distal end side. In other words, since the progress of the molten ball 55 is restricted (slows) at the wide-width portion 53c, when the welding work is terminated during this period (while the molten ball 55 is present at the wide-width portion 53c), the lock portion 53a does not melt and the lock state of the winding wire 30 to the conductive plate terminal 53 is held. That is, with this coupling structure, the winding wire 30 is wound around both the lock portion 53a and the fusion portion 53b in the conductive plate terminal 53 and the wide-width portion 53c is disposed to melt only the fusion portion 53b among the lock portion 53a and the fusion portion 53b, thus preventing the winding wire 30 from being disconnected during the welding. Thus, the wide-width portion 53c has the function to restrict (dam) the progress of the molten ball 55 to the lock portion 53a in the case of the welding from the fusion portion 53b side.

Figure 7A:
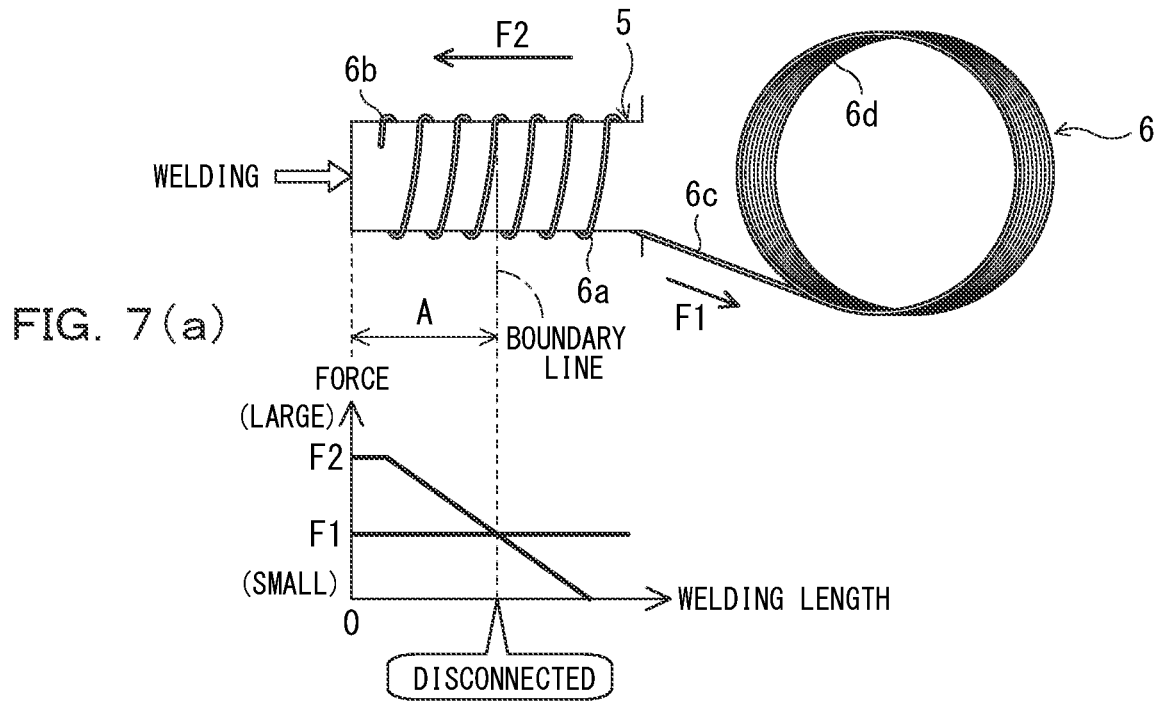
FIGS. 7(a) and 7(b) are schematic diagrams to describe a mechanism of causing disconnection.
Figure 7B:
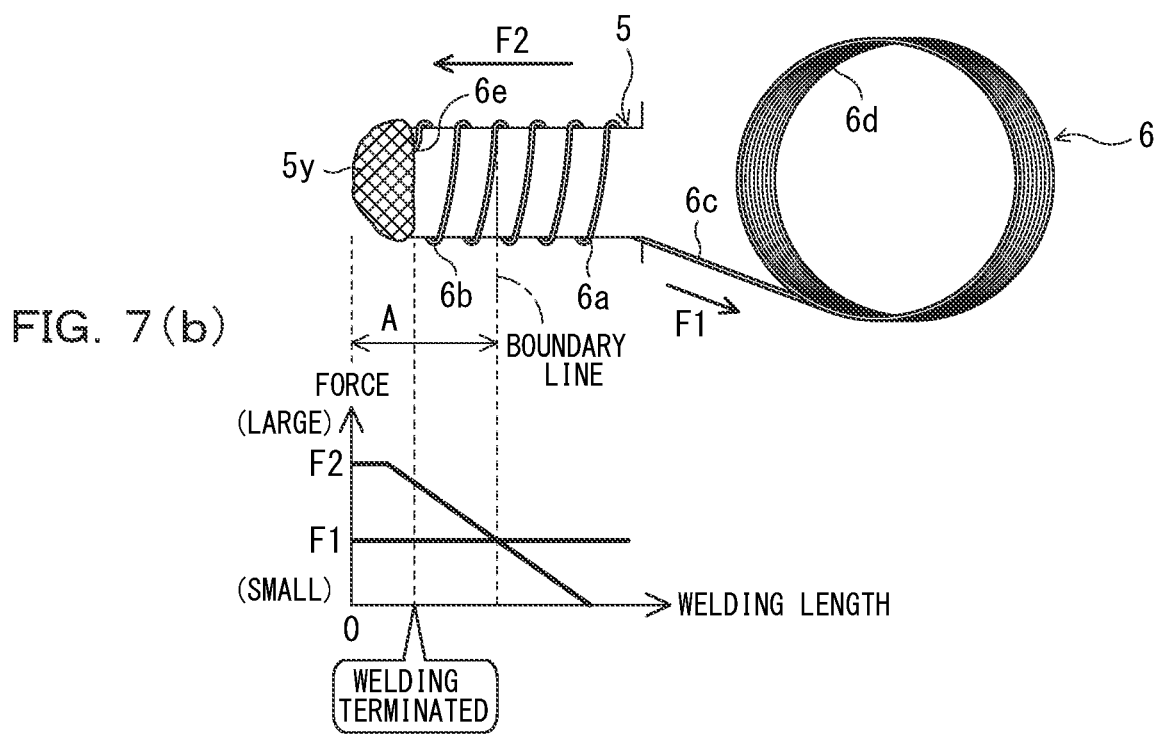

The following describes a mechanism to generate the disconnection during the welding with reference to FIGS. 7(a) and 7(b). FIGS. 7(a) and 7(b) illustrate a relationship between the force and the welding length (graph) in addition to the drawings illustrating the state of winding a winding wire 6 around a terminal 5, which is a simplified shape of the above-described conductive plate terminal 53. FIG. 7(a) illustrates the shape before the welding, and FIG. 7(b) illustrates the shape after the welding. The terminal 5 is formed into a flat plate shape with one kind of material and has a uniform cross-sectional shape. The winding wire 6 includes a first winding wire portion 6a (binding portion), which corresponds to the above-described winding wire 30 and is wound around the base end side of the terminal 5, a second winding wire portion 6b, which is continuous with the first winding wire portion 6a and is wound around the distal end side of the terminal 5, and a coupling wire portion 6c, which is tightly stretched from a main winding wire portion 6d in the wound state and is continuous with an end portion (other end portion) of the first winding wire portion 6a.

A force pulling the winding wire 6 (namely, the first winding wire portion 6a and the second winding wire portion 6b) wound around the terminal 5 to the main winding wire portion 6d side (hereinafter referred to as "the coupling tension F1") acts on the coupling wire portion 6c. The coupling tension F1 is a force generated by winding the winding wire 6 around a predetermined component (for example, a rotor core) at the predetermined tension (so-called winding wire tension) and is a force identical to or slightly stronger than the winding wire tension.

Meanwhile, the force attempting to stay in the state wound around the terminal 5 (a force of holding the wound state, hereinafter referred to as "a bearing power F2") acts on the first winding wire portion 6a and the second winding wire portion 6b. The bearing power F2 corresponds to a force of adding a friction force of the winding wire 6 and a rigidity force of the winding wire 6. A magnitude of the friction force of the winding wire 6 is determined by the tension when the winding wire 6 is wound around the terminal 5 (so-called hook tension), a thickness of the winding wire 6, the number of windings of the winding wire 6 to the terminal 5, and the like. The magnitude of the rigidity force of the winding wire 6 is determined by the rigidity of the winding wire 6. For easy understanding of the bearing power F2 in FIGS. 7(a) and 7(b) being the force against the coupling tension F1, the bearing power F2 is expressed by the arrow (pointing the left in the drawing) in the direction opposite to the arrow indicative of the coupling tension F1.

As illustrated in FIG. 7(a), the winding wire 6 wound around and locked to the terminal 5 is motionless without looseness before the welding (the welding length is 0); therefore, the magnitude relationship between the coupling tension F1 and the bearing power F2 is "F1<F2" as shown in the graph. Welding the terminal 5 in the state from the distal end side melts the winding wire 6 together with the terminal 5; therefore, as the welding proceeds (the longer the welding length is), the bearing power F2 gradually decreases. When the welding proceeds up to a certain position (the boundary line by the one dot chain line in the drawing), the magnitude relationship between the coupling tension F1 and the bearing power F2 is reversed, disconnecting the winding wire 6. This disconnection mechanism possibly occurs through thermal bonding capable of melting the winding wire 6, not limited to the welding. For example, for soldering the winding wire 6 with the copper as the main component and the terminal 5, a phenomenon referred to as "leaching" where the copper melts in the melted solder occurs. This possibly melts the winding wire 6, possibly resulting in the disconnection of the winding wire 6 similar to the above-described case.

Accordingly, to avoid the winding wire 6 to be disconnected, it is only necessary to terminate the welding within a range A (the distal end side with respect to the boundary line) in which the magnitude relationship between the coupling tension F1 and the bearing power F2 is not reversed. For example, as illustrated in FIG. 7(b), terminating the welding within the range A still maintains the state of the relationship of the bearing power F2 being larger than the coupling tension F1 (F2>F1) after the welding. In view of this, the coupling tension F1 does not act on the one end portion (hereinafter referred to as "a root 6e") of the winding wire 6 positioned at the boundary with a molten ball 5y; therefore, the stress by the winding wire tension is not applied. This prevents the disconnection at the root 6e due to secular change. Even if the vibration is applied to this coupling structure, since the coupling tension F1 does not act on the root 6e, the disconnection due to the vibration is also prevented.

Accordingly, it is only necessary to preliminary dispose a non-welded part on the base end side of the terminal 5 so as to generate the bearing power F2 larger than the coupling tension F1 only by the winding wire part wound around this part. For example, it is considered that, the distal end side of the terminal 5 (a range smaller than the range A) is preliminary configured as the welded part (welded area) and the base end side is configured as the part not being welded (non-welded area) to construct the coupling structure where the winding wire 6 is wound around so as to generate the bearing power F2 larger than the coupling tension F1 only by the winding wire part wound around the non-welded area. In this coupling structure, when the winding wire part wound around the non-welded area in the terminal 5 at the bearing power F2 larger than the coupling tension F1 is configured as the first winding wire portion 6a and the winding wire part wound around the welded area as the second winding wire portion 6b, the first winding wire portion 6a becomes the part not thermally bonded (non-heat bonded portion) and the second winding wire portion 6b becomes the part to be thermally bonded (heat bonded portion).

It is considered that the coupling structure providing an area having the property of being less likely to melt compared with the welded area between the welded area and the non-welded area is configured. That is, as illustrated in FIG. 8(a), the range A includes an area B (difficult-to-melt area B) of which thermal capacity is larger than the other area in the range A at the base end side part. With this coupling structure, as illustrated in FIG. 8(b), progressing the welding from the distal end side of the terminal 5 decreases the melting rate from a time point of entering into the difficult-to-melt area B, thereby ensuring lengthening a period required to melt this area B (welding period tw). That is, it is only necessary to terminate the welding when the melting rate decreases in the coupling structure with the difficult-to-melt area B. This allows avoiding the non-welded area to melt and preventing the disconnection of the winding wire 6 during the welding. Furthermore, this eliminates the need for severely setting the timing to terminate the welding and further can locate the position of the molten ball in the area B, leading to the prevention of a position gap of the molten ball.

The coupling structure accommodating the disconnection mechanism has been described above. To configure such coupling structure, the lock portion 53a, the fusion portion 53b, and the wide-width portion 53c are disposed at the above-described coupling portion of the conductive plate terminal 53 and the winding wire 30, and the winding wire 30 is wound. That is, the respective lock portion 53a, fusion portion 53b, and wide-width portion 53c are disposed corresponding to the above-described non-welded area, welded area, and difficult-to-melt area. The first winding wire portion 31 in the winding wire 30 is wound around the lock portion 53a at the force (the force equivalent to the above-described bearing power F2), which is larger than the force of pulling the coupling wire portion 33 to the main winding wire portion 34 side (the force equivalent to the above-described coupling tension F1).

The welding is terminated so as to maintain the magnitude relationship (F2>F1) of the forces even after the completion of welding. In view of this, as illustrated in FIG. 6(b), the coupling tension F1 does not act on a root 36 (the one end portion of the first winding wire portion 31) of the winding wire 30, which is positioned at the boundary with the molten ball 55 (coupled to the molten ball 55 generated at the fusion portion 53b); therefore, the stress due to the winding wire tension is not applied. As described above, this prevents the disconnection at the root 36 due to secular change. Even if the vibration is applied to the coupling portion of the conductive plate terminal 53 and the winding wire 30, since the coupling tension F1 does not act on the root 36, the disconnection due to the vibration is also prevented.

The wide-width portion 53c, which functions to restrict the progress of the molten ball 55 when the conductive plate terminal 53 is welded from the distal end side, functions to partition the lock portion 53a and the fusion portion 53b after the welding and maintain the state of the bearing power F2 being larger than the coupling tension F1. That is, since the wide-width portion 53c restricts the entrance of the molten ball 55 to the lock portion 53a during the welding, the wide-width portion 53c reliably partitions the lock portion 53a and the fusion portion 53b (molten ball 55), reliably maintaining the state of F2>F1. Accordingly, the coupling tension F1 acting on the coupling wire portion 33 does not act on the root 36 after the welding as well.

To configure the coupling structure accommodating the disconnection mechanism similar to the conductive plate terminal 53, the lock portion 42c, the fusion portion 42d, and the wide-width portion 42e are disposed at the coupling portion of the commutator terminal 42b and the winding wire 30, and the winding wire 30 is wound. The respective lock portion 42c, fusion portion 42d, and wide-width portion 42e of the commutator terminal 42b are disposed corresponding to the above-described non-welded area, welded area, and difficult-to-melt area. That is, the soldering is performed on the fusion portion 42d on the distal end side, but the lock portion 42c is not welded. The wide-width portion 42e has the function as the difficult-to-melt portion and the function to restrict (dam) the progress of the molten ball to the lock portion 42c.

The winding wire part (the first winding wire portion, the binding portion) wound around the base end side of the commutator terminal 42b is wound around the lock portion 42c at the force (the force equivalent to the above-described bearing power F2), which is larger than the force of pulling the coupling wire portion to the main winding wire portion 34 side (the force equivalent to the above-described coupling tension F1). The soldering is terminated to maintain the magnitude relationship (F2>F1) of the forces even after the completion of welding. In view of this, the coupling tension F1 does not act on the root (the one end portion of the first winding wire portion) of the winding wire 30, which is positioned at the boundary with the molten ball (continuous with the molten ball generated at the fusion portion 42d) in the commutator terminal 42b as well; therefore, the stress due to the winding wire tension is not applied.

In the case of soldering (brazing), although basically the melted solder 45 (brazing filler metal) becomes the molten ball, a part of the fusion portion 42d possibly melts and also becomes the molten ball. That is, the molten ball is generated when at least the fusion portion is thermally bonded. Similar to the above-described wide-width portion 53c, the wide-width portion 42e functions to partition the lock portion 42c and the fusion portion 42d after the welding and maintain the state of the bearing power F2 being larger than the coupling tension F1. The wide-width portion 42e also serves to prevent the position gap of the molten ball during the bonding.

[3. Method for Forming Coupling Portion and Method for Manufacturing Rotor]

The following describes the method for manufacturing the rotor 3 including the method for forming the above-described coupling portion with reference to FIG. 9. This manufacturing method includes a shaping step of the conductive plate 50 (Step S10), an assembly step to the shaft 10 (Step S20), a winding step of winding the winding wire 30 (Step S30), and a bonding step of bonding both end portions of the winding wire 30 (Step S40), and the four steps are performed in this order. These steps may be automatically performed by a device or may be manually performed. Among these four steps, the shaping step, the winding step, and the bonding step are also the method for forming the coupling portion. The components of the rotor 3 (the shaft 10, the core 20, and the like) are preliminary prepared except for the conductive plate 50.

The shaping step shapes the conductive plate 50 into the above-described complete shape (predetermined shape) through presswork. That is, the shaping step shapes the conductive plate 50 including the plane surface 51, which forms the electrically neutral point, the three standing walls 52, which extend from the end portion radially outside of the plane surface 51 to the direction intersecting with the plane surface 51, and the conductive plate terminals 53, which project from the end portions of the respective standing walls 52 to radially outside. At this time, the height of the standing walls 52 of the conductive plate 50 is configured such that the conductive plate terminals 53 are positioned on the distal end side of the shaft 10 with respect to the wound mountains 35 of the winding wire 30 and are positioned on the core 20 side with respect to the commutator terminals 42b with the plane surface 51 of the conductive plate 50 placed on the end surface of the core 20. This embodiment sets the height of the standing wall 52 such that the conductive plate terminal 53 is positioned at the central area of the intermediate portion 70 between the wound mountains 35 and the commutator terminal 42b.

The conductive plate terminal 53 of the conductive plate 50 is formed into the complete shape including the above-described lock portion 53a, fusion portion 53b, and wide-width portion 53c (the partition portion and the difficult-to-melt portion). That is, the shaping step shapes the conductive plate terminal 53 such that the base end side of the conductive plate terminal 53 becomes the lock portion 53a, the distal end side becomes the fusion portion 53b, and the base end side with respect to the fusion portion 53b becomes the wide-width portion 53c, which is less likely to melt compared with the fusion portion 53b. This embodiment forms the conductive plate terminals 53 of the conductive plate 50 so as to bend extending in the direction perpendicular to the axial direction of the shaft 10 in the assembled state. Furthermore, the conductive plate 50 is shaped such that the conductive plate terminals 53 project radially outside with respect to the outer peripheral surface on the core 20 before and after the welding and do not contact the inner peripheral surface of the housing 2A after the welding.

The assembly step assembles the components such as the core 20, the conductive plate 50, which is shaped in the shaping step, the insulator 60, and the commutator 40, to the shaft 10.

The winding step provides the main winding wire portion 34 of the wound winding wire 30, the first winding wire portion 31 where the winding wire 30 is wound around the lock portions 42c and 53a, the second winding wire portion 32 of winding the winding wire 30 continuously from the first winding wire portion 31 around the fusion portions 42d and 53b, and the coupling wire portion 33 stretched between the main winding wire portion 34 and the first winding wire portion 31. That is, the first winding wire portion 31 is disposed interposing the coupling wire portion 33 with the main winding wire portion 34.

The winding step of this embodiment winds the one end of the winding wire 30 around one of the three commutator terminals 42b of the commutator 40 to provide the first wound portion 31 and the second winding wire portion 32. After that, the winding step winds the winding wire 30 around one of the three teeth 22 on the core 20 by the predetermined number of turns via the coupling wire portion 33 on which the predetermined tension (coupling tension F1) acts to provide the main winding wire portion 34. At this time, since the conductive plate terminal 53 of the conductive plate 50 is disposed at the central area of the intermediate portion 70, the work efficiency for winding of the winding wire 30 to the core 20 is secured.

Furthermore, the other end of the winding wire 30 extending from the main winding wire portion 34 is wound around (hooked) to the one corresponding conductive plate terminal 53 among the three conductive plate terminals 53 of the conductive plate 50 to provide the first winding wire portion 31 and the second winding wire portion 32 via the coupling wire portion 33. At this time, the winding wire 30 is wound around the respective commutator terminal 42b and conductive plate terminal 53 several times such that the force of the winding wire 30 (first winding wire portion 31) attempting to stay at the respective lock portions 42c and 53a of the commutator terminal 42b and the conductive plate terminal 53 (bearing power F2) becomes larger than force of pulling the coupling wire portion 33 to the main winding wire portion 34 side (coupling tension F1). That is, the winding wire 30 is wound around such that the winding wire 30 becomes motionless without looseness in the state where the winding wire 30 is bound to only the respective lock portions 42c and 53a. This work is performed at the three positions.

The bonding step bonds the one end of the winding wire 30 to the commutator terminal 42b by soldering and bonds the other end of the winding wire 30 to the conductive plate terminal 53 by TIG welding. At this time, the fusion portions 42d and 53b of both terminals 42b and 53 are melted to be thermally bonded to the second winding wire portion 32. Since the conductive plate terminal 53 of this embodiment is disposed at the central area of the intermediate portion 70 and projects radially outside with respect to the outer peripheral surface of the core 20, the heat during the bonding is less likely to transmit to the winding wire 30.

This manufacturing method (formation method) performs the bonding step after the winding step; however, the bonding step may be performed concurrently with the winding step. That is, the one end of the winding wire 30 is locked to the commutator terminal 42b, and this one end is bonded by thermal bonding (soldering). After that, the winding wire 30 may be wound around the core 20 to lock the other end and the thermal bonding (TIG welding) may be performed to manufacture the rotor 3.

[4. Effects]

(1) In the coupling portion with the above-described structure, the coupling tension F1 does not act on the root 36 of the winding wire 30 coupled to the molten ball 55; therefore, the stress due to the winding wire tension is not applied to this root 36. This ensures preventing the disconnection at the root 36 due to secular change. Even if the vibration is applied to the coupling portion of the conductive plate terminal 53 and the winding wire 30, since the root 36 is in the free state on which the coupling tension F1 does not act, the disconnection due to the vibration can also be prevented.

Increasing the bearing power F2 acting on the first winding wire portion 31 (binding portion) after the thermal bonding more than the coupling tension F1 ensures setting the state where the coupling tension F1 does not act on the root 36 of the first winding wire portion 31. That is, since the stress due to the winding wire tension is not applied to the root 36, the disconnection due to secular change and the disconnection due to vibrations can be prevented. The similar effects can be obtained from the commutator terminals 42b.

(2) The above-described conductive plate terminal 53 includes the wide-width portion 53c as the partition portion that partitions the lock portion 53a and the fusion portion 53b and maintains the state of the bearing power F2 being larger than the coupling tension F1. This ensures avoiding the coupling tension F1 acting on the coupling wire portion 33 to act on the root 36 after the welding as well. This allows preventing the disconnection at the root 36 due to the secular change and the vibrations.

This partition portion functions to restrict the progress of the molten ball 55 generated in the fusion portion 53b during the thermal bonding. In other words, the molten ball 55 is formed by being restricted (dammed) so as not to reach the lock portion 53a during the thermal bonding by the partition portion. Thus disposing the partition portion having the function to restrict the progress of the molten ball 55 at the conductive plate terminal 53 ensures melting the distal end side with respect to the partition portion for thermal bonding of the conductive plate terminal 53 and the winding wire 30.

This allows at least the state of the first winding wire portion 31 wound around the lock portions 53a not to be changed before and after the thermal bonding. Accordingly, as long as the first winding wire portion 31 is disposed so as not to apply the coupling tension F1 to the root 36 before the thermal bonding, the state where the coupling tension F1 is not applied to the root 36 can be set after the thermal bonding as well. This allows preventing the disconnection at the root 36 due to the secular change and the disconnection due to the vibrations. The similar effects can be obtained from the commutator terminals 42b.

(3) In the coupling portion with the above-described structure, the first winding wire portion 31 where the winding wire 30 is wound around the lock portions 42c and 53a of the terminals (the commutator terminal 42b and the conductive plate terminal 53) at the bearing power F2 larger than the coupling tension F1 acting on the coupling wire portion 33 is disposed as the non-heat bonded portion. Meanwhile, the second winding wire portion 32 where the winding wire 30 is wound around the fusion portions 42d and 53b of the terminals 42b and 53 is disposed as the heat bonded portion. That is, the second winding wire portion 32 is thermally bonded and therefore the binding state of the winding wire 30 at the lock portions 42c and 53a (the state of the first winding wire portion 31) does not change between before and after the thermal bonding.

This structure ensures preventing the winding wire 30 from being disconnected during the thermal bonding (during the electrical connection) of the terminals 42b and 53 and the winding wire 30. That is, the disconnection failure can be prevented and the thermal bonding can be stably performed, thereby ensuring improving the productivity and also improving the reliability and the quality of the product.

The above-described formation method including the winding step, which winds the winding wire 30, can similarly prevent the disconnection failure and perform the thermal bonding stably, thereby ensuring improving the productivity and also ensuring improving the reliability and the quality of the product. Furthermore, the above-described formation method terminates the melting while the state of the bearing power F2 being larger than the coupling tension F1 is maintained, thereby ensuring setting the state where the coupling tension F1 does not act on the root 36. This also ensures preventing the disconnection at the root 36 after the welding.

(4) In the coupling portion with the above-described structure, the difficult-to-melt portions (wide-width portions 42e and 53c), which are less likely to melt, are disposed on the base end sides of the terminals 42b and 53 with respect to the fusion portions 42d and 53b. This allows the fusion portions 42d and 53b to melt during the thermal bonding with the winding wire 30, thus ensuring the thermal bonding of the terminals 42b and 53 and the winding wire 30. In other words, since the binding state of the first winding wire portion 31, which is disposed interposing the coupling wire portion 33 with the main winding wire portion 34, is configured not to be changed between before and after the thermal bonding, this ensures preventing the winding wire 30 from being disconnected during the thermal bonding (during the electrical connection). That is, the disconnection failure can be prevented and the thermal bonding can be stably performed, thereby ensuring improving the productivity and also improving the reliability and the quality of the product.

The above-described formation method including the shaping step, which shapes the terminals 42b and 53 into the complete shape, can similarly prevent the disconnection failure and perform the thermal bonding stably, thereby ensuring improving the productivity and also ensuring improving the reliability and the quality of the product. Furthermore, the above-described formation method can configure the binding state of the first winding wire portion 31 so as not to be changed between before and after the thermal bonding with the difficult-to-melt portion. Accordingly, as long as the bearing power F2 of the first winding wire portion 31 is configured to be larger than the coupling tension F1 before the thermal bonding, the state of F2>F1 can be maintained also after the thermal bonding. That is, this ensures avoiding the coupling tension F1 to act on the root 36; therefore, this allows preventing the disconnection at the root 36 due to the secular change and the disconnection due to the vibrations. A site functioning as the difficult-to-melt portion during the thermal bonding becomes the partition portion after the welding.

(5) In the coupling portion with the above-described structure, the terminals 42b and 53 include the difficult-to-melt portions (wide-width portions 42e and 53c), which are less likely to melt compared with the fusion portions 42d and 53b, on the base end sides with respect to the fusion portions 42d and 53b. Although the thermal bonding continues until the molten ball 55 advances the difficult-to-melt portion, as illustrated in FIG. 8(b), since the progress of the molten ball 55 slows at the difficult-to-melt portion, eliminating the need for severely setting the timing to stop the thermal bonding. In other words, the control of the thermal bonding is facilitated, ensuring eliminating the need for severe time management (production conditions) and ensuring further improving the work efficiency and the productivity. Since the progress of the molten ball 55 slows at the difficult-to-melt portion and the control of the thermal bonding is facilitated, the radial position gap of the molten ball 55 can be prevented, ensuring further improving the reliability of the product.

(6) In the coupling portion with the above-described structure, the partition portions are disposed with the shape having the lateral cross-sectional area larger than the lock portions 42c and 53a. This allows easily disposing the partition portions at the terminals 42b and 53, thereby ensuring further improving the productivity. Since this embodiment provides the difficult-to-melt portions before becoming the partition portions with the shape having the lateral cross-sectional area larger than the fusion portions 42d and 53b, the difficult-to-melt portions can be easily disposed at the terminals 42b and 53, ensuring further improving the productivity.

(7) Especially, the above-described terminals 42b and 53 include the wide-width portions 42e and 53c with the width formed wider than the lock portions 42c and 53a as the partition portions; therefore, the shaping is easy and the productivity can be further improved. Disposing the wide-width portions 42e and 53c allows enhancing the rigidity of the terminals 42b and 53. This embodiment forms the difficult-to-melt portions before becoming the partition portions (namely, the wide-width portions 42e and 53c) with the width wider than the fusion portions 42d and 53b. This ensures making the shaping easy and further improving the productivity, ensuring enhancing the rigidity of the terminals 42b and 53. Furthermore, the area in contact with the molten ball 55 is wide, thus ensuring preventing the molten ball 55 from falling and ensuring further enhancing the reliability and the quality of the product.

(8) The rotor 3 and the motor 1 that apply the coupling portion with the above-described structure can prevent the winding wire 30 from being disconnected during the thermal bonding and also can prevent the disconnection after the thermal bonding, thereby ensuring enhancing the productivity regardless of the sizes of the rotor 3 and the motor 1. This also ensures enhancing the reliability and the quality of the rotor 3 and the motor 1.

[5. Modifications]

Figure 10A:
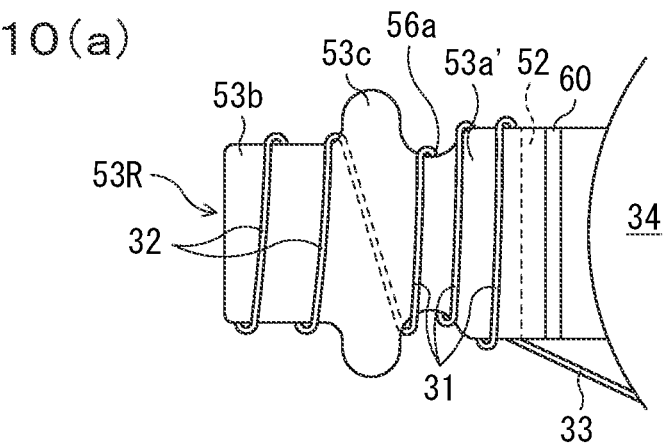
FIGS. 10(a), 10(b) and 10(c) are schematic diagrams illustrating modifications of the conductive plate terminal in FIG. 6(a).
Figure 10B:
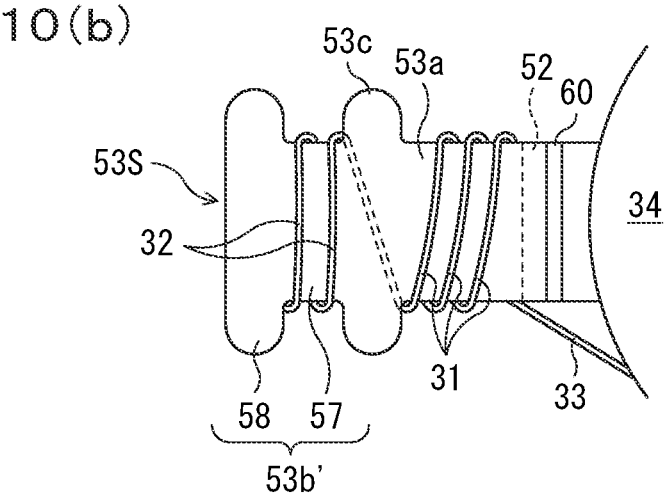
Figure 10C:
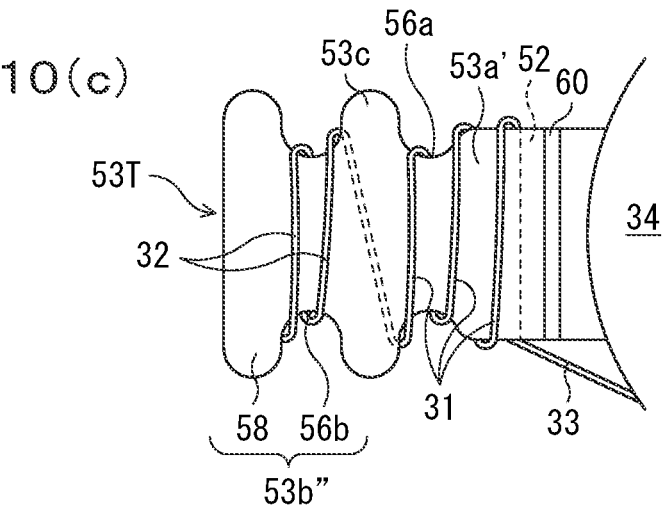

The above-described shapes of the conductive plate terminal 53 are one example and are not limited to the above-described shapes. FIGS. 10(a) to 10(c) describe the modifications of the conductive plate terminal 53 as the examples.

[5-1. Modifications Regarding Terminal Shape]

As illustrated in FIG. 10(a), a lock portion 53a' of a conductive plate terminal 53R may have a concave portion 56a, which is concaved to have a narrow width, on a site (a part adjacent to the wide-width portion 53c) on a distal end side of this lock portion 53a'. With the conductive plate terminal 53R with this shape, the binding state of the winding wire 30 (the first winding wire portion 31, the binding portion) wound around the concave portion 56a is easily held. That is, since the friction force between the winding wire 30 and the conductive plate terminal 53R increases, the bearing power F2 can be larger compared with the shape illustrated in FIG. 6(a) in the case where the hook tension is identical to the above-described embodiment. This allows preventing the winding wire 30 from being disconnected during the thermal bonding and also allows preventing the disconnection at the root 36 after the thermal bonding.

As illustrated in FIG. 10(b), a fusion portion 53b' of a conductive plate terminal 53S may be disposed as a shape combining a rectangular portion 57 with a second wide-width portion 58. That is, the different wide-width portion 58 may be formed on the distal end side of the fusion portion 53b of the conductive plate terminal 53 illustrated in FIG. 6(a). For example, a configuration that cuts off the winding wire 30 by pulling to the distal end side of the conductive plate terminal 53S possibly comes off the winding wire 30 (second winding wire portion 32) wound around the rectangular portion 57 of the fusion portion 53b' from the distal end side of the conductive plate terminal 53S during the cutting. However, the conductive plate terminal 53S with such shape can prevent the winding wire 30 from coming off with the second wide-width portion 58.

The conductive plate terminal 53 may have the terminal shape combining the above-described two conductive plate terminals 53R and 53S shapes. As illustrated in FIG. 10(c), a fusion portion 53b" of a conductive plate terminal 53T may be disposed as a shape combining a second concave portion 56b and the second wide-width portion 58. The conductive plate terminal 53T with this shape facilitates holding the binding state of the winding wire 30 (the first winding wire portion 31 and the second winding wire portion 32) wound around the respective concave portion 56a and second concave portion 56b. Additionally, this can prevent the winding wire 30 (second winding wire portion 32) wound around the second concave portion 56b from coming off similar to the above-described case with the second wide-width portion 58.

The above-described embodiment describes that both commutator terminal 42b and conductive plate terminal 53 include the wide-width portions 42e and 53c as the difficult-to-melt portions as the example; however, the difficult-to-melt portions are not limited to the above-described configurations. FIGS. 11(a) to 11(f) illustrate modifications of the difficult-to-melt portions as examples. These drawings describes the modifications of the terminal 5 [namely, the terminal 5 illustrated in FIGS. 7 and 8(a)], which simplifies the shapes of the above-described conductive plate terminal 53 and the like.

Figure 11A:
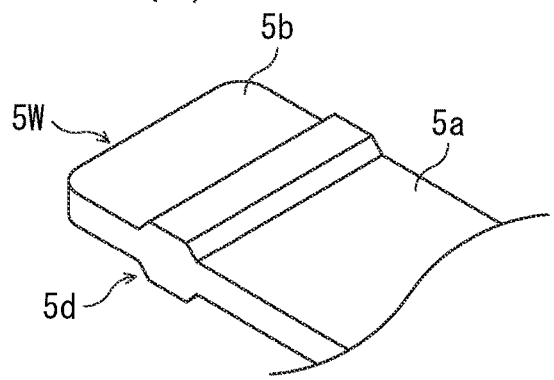
FIGS. 11(a), 11(b), 11(c), 11(d), 11(e) and 11(f) are schematic diagrams illustrating modifications of the difficult-to-melt portion.

A terminal 5W illustrated in FIG. 11(a) includes the difficult-to-melt portion (partition portion) as a wall thickness portion 5d formed thicker than a fusion portion 5b. The wall thickness portion 5d is disposed in the area B illustrated in FIG. 8(a). Since a lock portion 5a and the fusion portion 5b are formed with the identical thickness in this drawing, only the wall thickness portion 5d (difficult-to-melt portion) is thickened and has a lateral cross-sectional area larger than the other portions 5a and 5b. With the terminal 5W with this shape as well, the progress of the molten ball slows at the wall thickness portion 5d on the base end side with respect to the fusion portion 5b, thereby obtaining the operational effects similar to the above-described embodiment. Disposing the difficult-to-melt portion as the wall thickness portion 5d can enhance the rigidity of the terminal 5 similar to the above-described wide-width portion 53c and the like. With this terminal 5W, the wall thickness portion 5d functioning as the difficult-to-melt portion functions as the partition portion after the welding, thereby obtaining the effects similar to the above-described wide-width portion 53c and the like.

Figure 11B:
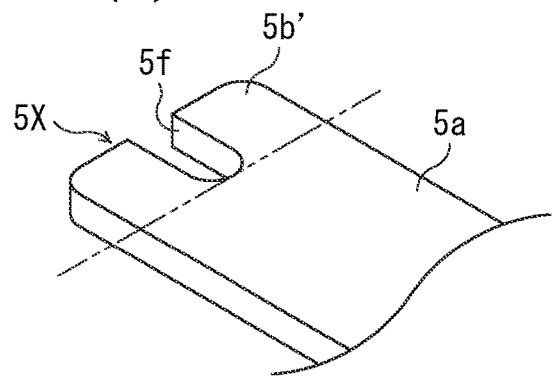

A terminal 5X illustrated in FIG. 11(b) provides the difficult-to-melt portion (partition portion) at the lock portion 5a by a cut-out portion 5f formed on a fusion portion 5b'. That is, the fusion portion 5b' has the cut-out portion 5f that reduces the lateral cross-sectional area compared with the difficult-to-melt portion (lock portion 5a). This reduces the lateral cross-sectional area of the fusion portion 5b' and therefore the lateral cross-sectional area of the lock portion 5a on the base end side can be relatively larger than the fusion portion 5b', allowing the lock portion 5a to function as the difficult-to-melt portion.

The cut-out portion 5f is formed (concaved) by notching, for example, an approximately center of the fusion portion 5b' in the width direction from the distal end side so as to pass through the thickness direction. The two-dot chain line in FIG. 11(b) indicates a boundary line on the distal end side of the area B illustrated in FIG. 8(a). As illustrated in FIG. 11(b), the cut-out portion 5f is disposed at a position not overlapping with the area B illustrated in FIG. 8(a). The terminal 5X with this configuration also slows the progress of the molten ball on the base end side with respect to the fusion portion 5b', obtaining the operational effects similar to the above-described embodiment. Only the formation of the cut-out portion 5f on the terminal 5 allows the lock portion 5a on the base end side with respect to the fusion portion 5b' to function as the difficult-to-melt portion. This makes the shaping easy, ensuring improving the productivity. With the terminal 5X, a part of the distal end side of the lock portion 5a functions as the difficult-to-melt portion. Accordingly, a clear boundary is absent between the lock portion 5a and the partition portion.

Figure 11C:
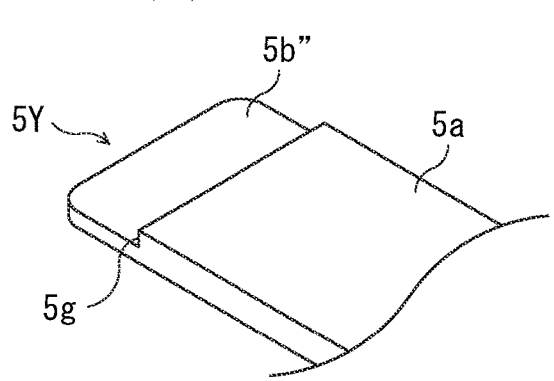

A terminal 5Y illustrated in FIG. 11(c) relatively provides the difficult-to-melt portion (partition portion) by a stepped portion 5g formed by notching a fusion portion 5b". That is, the stepped portion 5g reduces the lateral cross-sectional area of the fusion portion 5b". This relatively increases the lateral cross-sectional area of the base end side (lock portion 5a) with respect to the fusion portion 5b". The stepped portion 5g is formed by disposing the notch such that the thickness of the fusion portion 5b" becomes smaller than the lock portion 5a. Similar to the cut-out portion 5f in FIG. 11(b), the stepped portion 5g is also disposed at the position not overlapping with the area B illustrated in FIG. 8(a). The terminal 5Y with this configuration also slows the progress of the molten ball on the base end side with respect to the fusion portion 5b'', obtaining the operational effects similar to the above-described embodiment. With the terminal 5Y, a part of the distal end side of the lock portion 5a functions as the difficult-to-melt portion similar to the terminal 5X. Accordingly, a clear boundary is absent between the lock portion 5a and the partition portion.

Figure 11D:
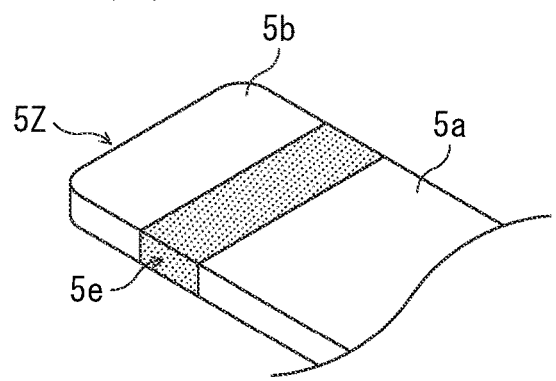
Figure 11E:
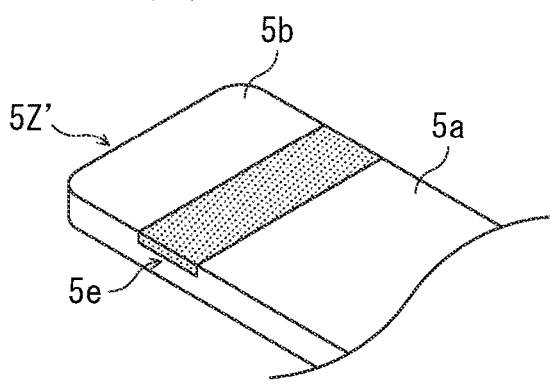
Figure 11F:
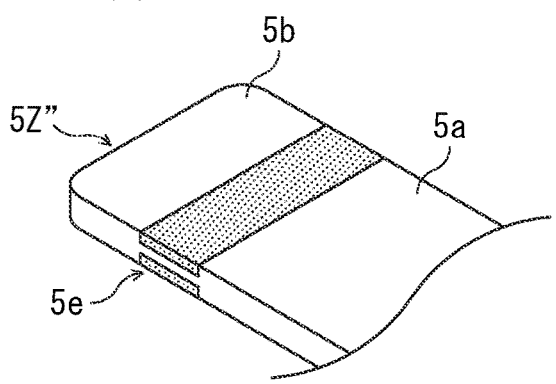

The difficult-to-melt portions (partition portions) of all terminals 5Z, 5Z', and 5Z'' illustrated in FIGS. 11(d) to 11(f) are disposed as different-material portions 5e made of the material with the property of being less likely to melt compared with the material of the fusion portion 5b. The different-material portion 5e is disposed in the area B illustrated in FIG. 8(a). In these drawings, since the lock portion 5a and the fusion portion 5b are made of the identical material, only the different-material portion 5e (the difficult-to-melt portion, the partition portion) is made of the different material and is less likely to melt compared with the other portions 5a and 5b. As the material of the different-material portion 5e, a material with a melting point higher than the fusion portion 5b (for example, an iron, a tungsten, and a molybdenum) and a material with a thermal capacity per unit volume larger than the fusion portion 5b are used.

In FIG. 11(d), a part of the terminal 5Z in the longitudinal direction is wholly formed as the different-material portion 5e. Meanwhile, in FIGS. 11(e) and 11(f), the different-material portion 5e is disposed at a part of the terminals 5Z' and 5Z'' in the longitudinal direction on one surface or both surfaces. That is, the different-material portion 5e does not completely separate the lock portion 5a from the fusion portion 5b on the terminals 5Z' and 5Z''. These terminals 5Z' and 5Z'' are formed by, for example, providing a hollow on the terminal surface (one surface or both surfaces) and bonding the material different from the fusion portion 5b to the hollow. With the terminals 5Z, 5Z', and 5Z'' with this configuration as well, the progress of the molten ball slows at the different-material portion 5e on the base end side with respect to the fusion portion 5b, thereby obtaining the operational effects similar to the above-described embodiment. Disposing the difficult-to-melt portion as the different-material portion 5e can control the progress of the molten ball depending on the setting of the material of the different-material portion 5e, ensuring improving the productivity.

The difficult-to-melt portion (partition portion) may be constituted by a combination of the wide-width portions 42e and 53c of the above-described embodiment and the wall thickness portion 5d, the different-material portion 5e, the cut-out portion 5f, the stepped portion 5g, and the like illustrated in FIGS. 11(a) to 11(f). It is only necessary that the difficult-to-melt portion (partition portion) at least has the property of being less likely to melt on the base end side with respect to the fusion portion compared with the fusion portion, and the difficult-to-melt portion (partition portion) may include the above-described configurations (or a configuration other than these configurations).

[5-2. Modifications Regarding Wound State and Material]

Figure 12A:
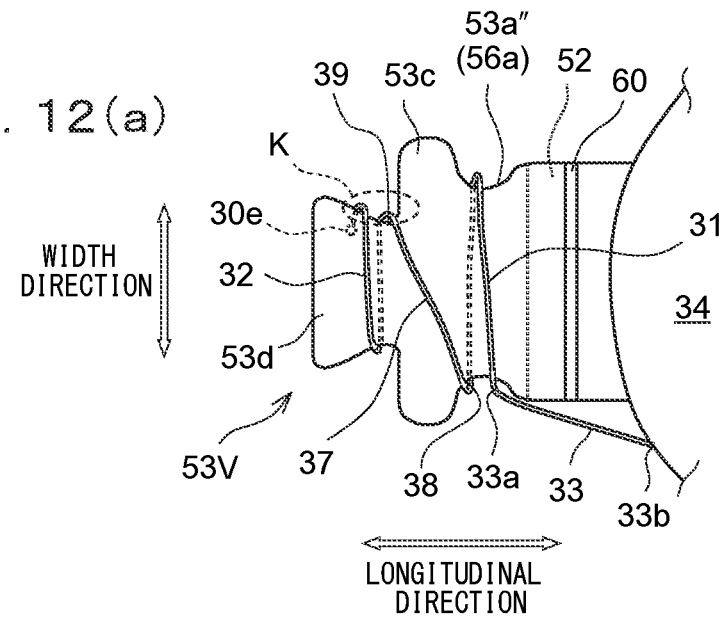
FIGS. 12(a) and 12(b) are schematic diagrams illustrating a wound state of a winding wire around the conductive plate terminal according to the modifications.
Figure 12B:
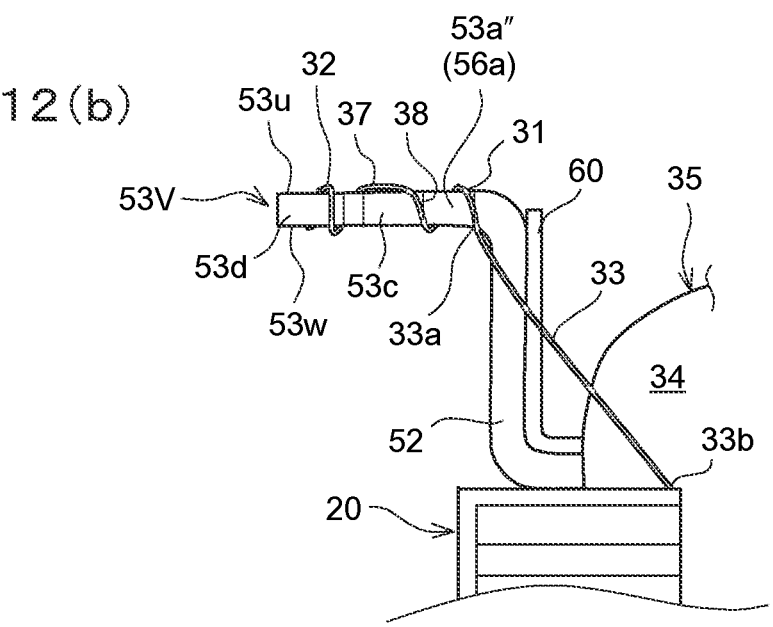

The way of binding (wound state) of the winding wire 30 to the lock portions 53a and 53a' is not limited to the above-described way. Here, FIGS. 12(a) and 12(b) illustrate one example. A conductive plate terminal 53V illustrated in these drawings has a longitudinal direction dimension of a lock portion 53a'' smaller than that of the conductive plate terminal 53R in FIG. 10(a). Dimensions of a fusion portion 53d both in the longitudinal direction and the width direction are also small, having an enlarged shape toward the distal end.

Like the wound state illustrated in FIGS. 12(a) and 12(b), the winding wire 30 may be extended from the main winding wire portion 34 to the lock portion 53a'' such that one end portion 33a and the other end portion 33b of the coupling wire portion 33 on which the coupling tension F1 acts are positioned on the side identical to one another in the width direction of the conductive plate terminal 53V [the lower side in FIG. 12(a)]. That is, the coupling wire portion 33 may be disposed so as not to cross the conductive plate terminal 53V.

In the examples illustrated in FIGS. 12(a) and 12(b), the one end portion 33a of the coupling wire portion 33 on the first winding wire portion 31 side is caught on the concave portion 56a on the other end portion 33b side and is continuous with the first winding wire portion 31 wound around the lock portion 53a''. The position of the coupling wire portion 33 with respect to the conductive plate terminal 53V is on the end bell 4 side at the main winding wire portion 34 and on the side heading for the top of the wound mountain 35. The one end portion 33a of the coupling wire portion 33 may be disposed abutting on an edge of the standing wall 52 on the other end portion 33b side and may be continuous with the first winding wire portion 31 wound around the lock portion 53a''.

Thus, disposing both end portions 33a and 33b of the coupling wire portion 33 on the identical side allows the coupling wire portion 33 to stably secure the contactless state with respect to the respective conductive plate terminal 53V and main winding wire portion 34. Supposing that the one end portion and the other end portion of the coupling wire portion are disposed on sides opposite to one another with respect to the conductive plate terminal, depending on the axial direction position (height position) of the coupling wire portion, a length at which the coupling wire portion contacts neither the conductive plate terminal nor the main winding wire portion (contactless length) is long in some cases or extremely short in some cases. In contrast to this, with the conductive plate terminal 53V illustrated in FIGS. 12(a) and 12(b), regardless of the axial direction position (height position) of the coupling wire portion 33, the fixed contactless length can be stably secured. This allows preventing a layer short due to a contact between the winding wires where a film is peeled off or between the wound mountain 35 and a pinhole, ensuring improve the quality.

As illustrated in FIGS. 12(a) and 12(b), the winding wire 30 is wound around the lock portion 53a'' and is wound around the fusion portion 53d after obliquely crossing the wide-width portion 53c. That is, a terminal wire portion 30e (distal end) of the winding wire 30 is positioned at the fusion portion 53d. Accordingly, the terminal wire portion 30e of the winding wire 30 is included in the molten ball 55, thereby ensuring preventing the looseness of the winding wire 30. Hereinafter, the part obliquely crossing the wide-width portion 53c is referred to as a crossing wire portion 37 (a part of the first winding wire portion 31). The crossing wire portion 37 is the part obliquely crossing the wide-width portion 53c from a rounded portion 38, which is positioned on the base end side of the wide-width portion 53c in the longitudinal direction, to a rounded portion 39 of the fusion portion 53d.

Figure 13A:
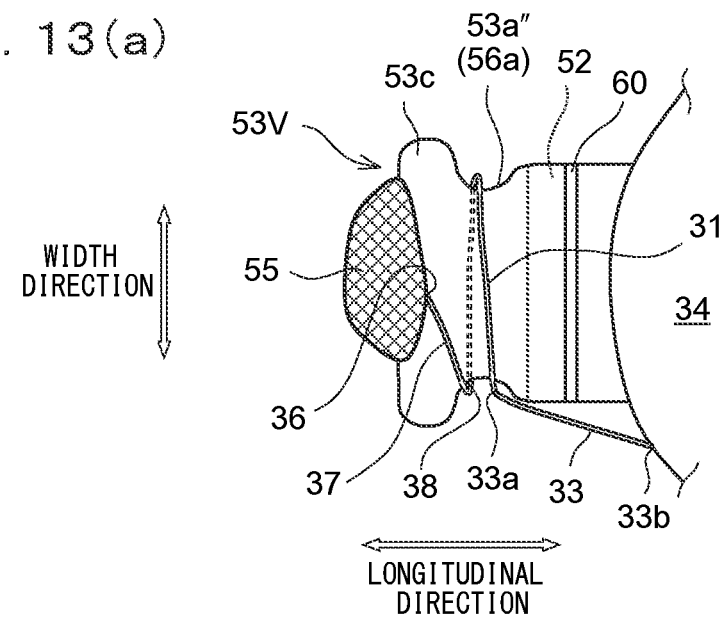
FIGS. 13(a) and 13(b) are drawings corresponding to FIGS. 12(a) and 12(b) after welding, respectively.
Figure 13B:
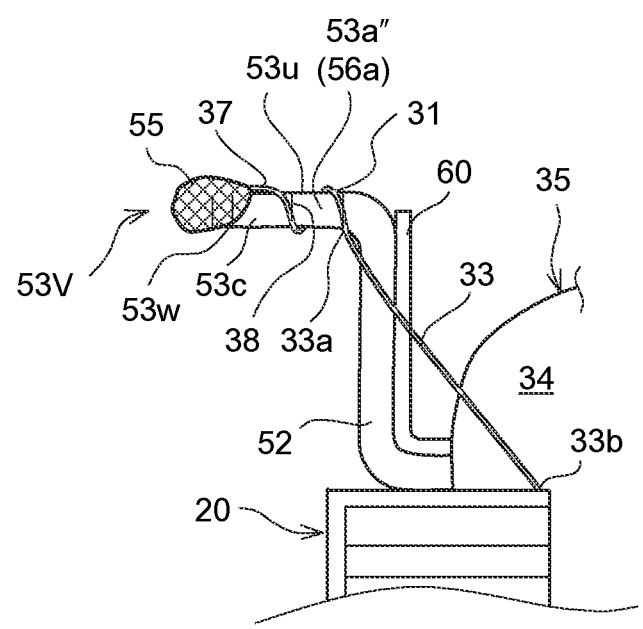

This crossing wire portion 37 is disposed along, not a surface of the conductive plate terminal 53V on the main winding wire portion 34 side (one surface, hereinafter referred to as "a lower surface 53w"), but a surface on a side opposite to the lower surface 53w (other surface, hereinafter referred to as "a top surface 53u"). That is, in the conductive plate terminal 53V, the crossing wire portion 37 is disposed at only the top surface 53u but is absent on the lower surface 53w side. Accordingly, in the case where the conductive plate terminal 53V is welded from the distal end side by TIG welding, the molten ball 55, which is generated by melting the fusion portion 53d, is positioned on the top surface 53u side of the conductive plate terminal 53V as illustrated in FIGS. 13(a) and 13(b).

It is considered that, this occurs because the melted fusion portion 53d (during the welding) has the property of being likely to be drawn to a side of larger melting margin (influence of surface tension). This property causes the liquid fusion portion 53d to approach the top surface 53u side on which the crossing wire portion 37 is present and the fusion portion 53d hardens in association with the termination of welding. Thus, the molten ball 55 is positioned on the top surface 53u side. Accordingly, compared with the case of the molten ball 55 being positioned on the lower surface 53w side, a distance between the molten ball 55 and the coupling wire portion 33 can be lengthened. This ensures restraining the transmission of the heat during the bonding and ensures contribution to the prevention of the disconnection.

Since the TIG welding is employed similar to the above-described embodiment, this modification uses a gas shielded arc welding method. That is, to cut off the molten metal (fusion portion 53d) and an arc from the atmosphere (air) during the welding to stabilize the melting quality, an inert gas such as an argon (shield gas) is sprayed to the fusion portion 53d. Here, as described above, with the conductive plate terminal 53V of this modification, the arrangement of the crossing wire portion 37 is devised (is disposed only on the top surface 53u) such that the molten ball 55 is positioned on the top surface 53u side. In other words, this modification does not control the position of the molten ball 55 by the spraying direction of the shield gas. In view of this, the direction of spraying the shield gas can be freely set and the shield gas flow rate can be reduced. This ensures a cost reduction.

Supposing, it is also considered that, the crossing wire portion is not positioned like this modification (for example, the crossing wire portion is disposed only on the lower surface side) and the molten ball is positioned on the top surface side by the shield gas. However, this requires securing the shield gas flow rate by the amount of moving the molten ball and also requires controlling the direction of spraying the shield gas highly accurately. Furthermore, since the location of installing the conductive plate terminal during the welding varies more or less, even if the direction of spraying the shield gas is highly accurately controlled, stably positioning the molten ball on the top surface side is difficult. This modification can solve the problems.

Supposing, it is also considered that, the crossing wire portion is not positioned like this modification (for example, the crossing wire portion is disposed only on the lower surface side) and the molten ball is positioned on the top surface side using, for example, own weight of the molten ball. In this case, for example, the welding with the distal end of the conductive plate terminal taking a posture facing upward does not stabilize the molten ball moving to the top surface side or the lower surface side of the conductive plate terminal by own weight. Therefore, first, the top surface of the conductive plate terminal needs to be disposed to face a direction of acting the gravitation (namely, verticality downward) and obliquely downward. However, the installation of the rotor becomes instable, and therefore the melting quality is instable. When a welding electrode is moved, not workpiece (conductive plate terminal), during the welding, since the welding electrode abuts on the distal end side (fusion portion side) of the conductive plate terminal, disposing the conductive plate terminal so as to extend in a horizontal direction increases the facility size in the horizontal direction. Furthermore, the use of own weight of the molten ball needs to increase the molten ball to cause the molten ball to move by own weight, being likely to vary the size of the molten ball. This modification also can solve these problems. A direction of the welding electrode may be configured such that the molten ball 55 is disposed on the top surface 53u side.

Figure 14:
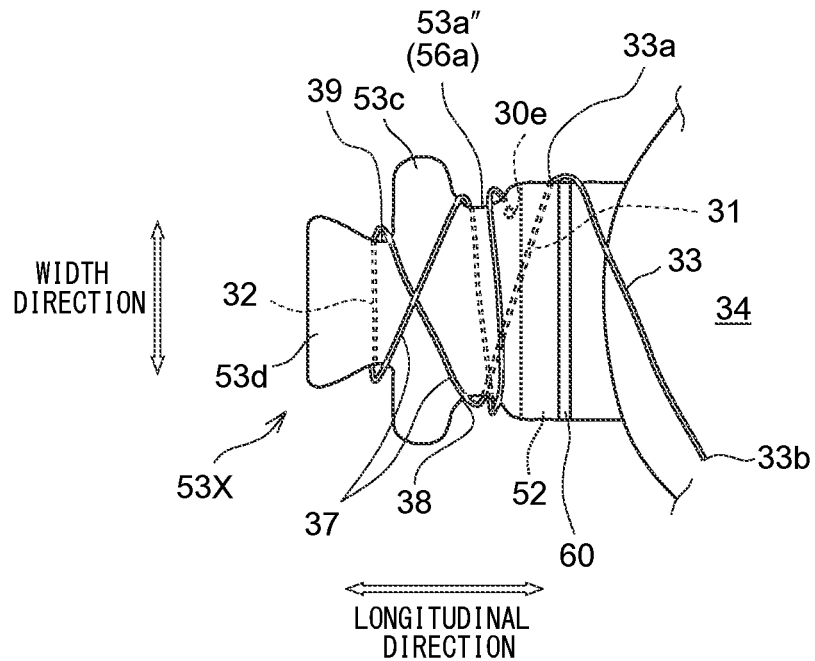
FIG. 14 is a modification of FIG. 12(a).

As illustrated in FIGS. 12(a) and 12(b), the conductive plate terminal 53V includes the one crossing wire portion 37 on the top surface 53u side; however, for example, as illustrated in FIG. 14, the crossing wire portion 37 may intersect with one another on the top surface 53u side. In this case as well, the molten ball, which is generated by melting the fusion portion 53d, approaches the top surface 53u side, thereby ensuring obtaining the effects similar to the above-described effects. The shape of a conductive plate terminal 53X illustrated in FIG. 14 is identical to the one illustrated in FIG. 12(a), and only the binding way of the winding wire 30 (wound state) differs. Specifically, the one end portion 33a and the other end portion 33b of the coupling wire portion 33 of the winding wire 30 are disposed on the sides opposite to one another with respect to the conductive plate terminal 53X. That is, the one end portion 33a of the coupling wire portion 33 is caught on not to the concave portion 56a on the other end portion 33b side but the concave portion 56a on the opposite side. Thus, the winding wire 30 may be wound around such that the coupling wire portion 33 crosses the conductive plate terminal 53X in the width direction.

With the conductive plate terminals 53V and 53X illustrated in FIGS. 12(a) and 14, the crossing wire portion 37 is disposed only on the top surface 53u side. However, it is only necessary that the number of wires of the crossing wire portion 37 along the lower surface 53w is less than the number of wires of the crossing wire portion 37 along the top surface 53u. This facilitates controlling the position of the molten ball 55 in the thickness direction of the conductive plate terminal to the upper side (end bell 4 side). This can avoid a situation of the molten ball 55 in contact with the coupling wire portion 33, thereby ensuring preventing the disconnection during the welding. As described above, this ensures easily securing the distance between the molten ball 55 and the coupling wire portion 33 (the heat of the molten ball 55 is less likely to transmit to the coupling wire portion 33), thus ensuring the contribution to the prevention of disconnection.

As illustrated in FIG. 12(a), the winding wire 30 is wound so as not to overlap with the fusion portion 53d. That is, as indicated by a dashed line K in the drawing, at the rounded portion 39 of the fusion portion 53d, the end portion of the crossing wire portion 37 and the second winding wire portion 32 are wound so as not to overlap in the width direction of the conductive plate terminal 53V. The end portion of the crossing wire portion 37 and the second winding wire portion 32 may be wound around to be displaced from one another in the longitudinal direction of the conductive plate terminal 53V. Here, the winding wire 30 is wound around the fusion portion 53d once. To wind the winding wire 30 several times, the second winding wire portion 32 is wound around so as not to overlap with one another.

Thus, winding the winding wire 30 along the fusion portion 53d can eliminate a gap between the winding wire 30 and the conductive plate terminal 53V. Supposing there is the gap between the winding wire and the terminal, the larger amount of the fusion portion needs to be melted to reliably secure the energization, resulting in the large molten ball. This makes the molten ball closer to the winding wire near the molten ball (the main winding wire portion and the coupling wire portion) and also the larger thermal capacity is applied. This causes the heat to be likely to transmit to the winding wire and the insulator via the conductive plate terminal, causing a failure such as a high possibility of causing the disconnection and a melting of the insulator. Meanwhile, eliminating the gap between the winding wire 30 and the conductive plate terminal 53V can decrease the melting margin, thereby ensuring configuring the molten ball 55 small. In other words, the energization can be secured with the small molten ball 55, allowing preventing the above-described failure.

In the examples illustrated in FIGS. 12(a) and 12(b), the fusion portion 53d of the conductive plate terminal 53V has the dimension in the longitudinal direction and the dimension in the width direction both smaller than those of the fusion portion 53b and the like illustrated in FIG. 10(a) and the like and has the shape enlarging to radially outside. This shape allows preventing the winding wire (second winding wire portion 32) wound around the fusion portion 53d from coming off and also allows configuring the generated molten ball 55 small.

With the fusion portion 53d made of the material with the melting point lower than that of the material of the winding wire 30 (for example, the material of the winding wire 30 is the high purity copper (oxygen free copper) and the material of the fusion portion 53d is the phosphor bronze), the fusion portion 53d melts preceding the winding wire 30. The melted fusion portion 53d wraps the winding wire 30 and hardens, becoming the molten ball 55. Since the film of the winding wire 30 is made of the material such as a polyurethane (the material with the melting point lower than that of the fusion portion 53d), the film melts before the fusion portion 53d melts. In view of this, wrapping the winding wire 30 by the molten ball 55 secures the energization.

That is, while the fusion portion 53d completely melts, only the film completely melts in the winding wire 30 and the cable core (copper wire) does not completely melt. Therefore, a boundary surface with the winding wire 30 (cable core) (tissue boundary between the oxygen free copper and the phosphor bronze) is formed in the molten ball 55. The conductive plate terminal 53V and the winding wire 30 are bonded in this state, thereby ensuring preventing the disconnection at the root 36. Furthermore, since the above-described tissue boundary is formed in the molten ball 55, the tensile strength can be improved.

To form the conductive plate 50 with a single plate, it is only necessary to use the material with the melting point lower than that of the winding wire 30 (for example, the phosphor bronze) as the material of the conductive plate 50. Only the conductive plate terminal 53V or 53X or only fusion portion 53d may be made of the material with the melting point lower than that of the winding wire 30.

It is only necessary that the number of windings of the winding wire 30 to the respective sites of the terminal 53V and the like may be once or more. Obviously, the wound state illustrated in FIGS. 12(a) and 12 (b) may be applied to the conductive plate terminal 53 and the like illustrated in FIG. 6(a) and the like.

[5-3. Others]

The configuration of the motor 1 described in the above-described embodiment is one example and is not limited to the above-described configuration. That is, the shapes and the configurations of the stator 2, the rotor 3, and the end bell 4 are not limited to the above-described shapes and configurations. The configuration of the conductive plate 50 may be the configuration other than the above-described configurations. For example, the conductive plate terminal 53 of the conductive plate 50 may be disposed not at the central area in the axial direction of the intermediate portion 70 between the wound mountain 35 and the terminal 42b but may be disposed close to the wound mountain 35 or close to the terminal 42b.

The standing wall 52 of the conductive plate 50 may be bent to form an obtuse angle with respect to the plane surface 51. In this case as well, it is preferable that the conductive plate terminal 53 projects from the standing wall 52 to the outside in the direction perpendicular to the axial direction of the shaft 10. That is, the standing wall 52 may not be perpendicular to the conductive plate terminal 53. The conductive plate terminal 53 may project to a direction not perpendicular to the axial direction of the shaft 10. For example, when the conductive plate terminal 53 projects obliquely outside to the distal end side (end bell 4 side) of the shaft 10 with respect to the axial direction of the shaft 10, the distal end of the conductive plate terminal 53 can be farther from the winding wire 30, ensuring reducing the influence of heat.

The conductive plate 50 may not include the standing walls 52. That is, the conductive plate 50 may be the conductive plate that includes the conductive plate terminals 53 on the plane surface identical to the plane surface 51. In this case, it is only necessary that the conductive plate is positioned with respect to the shaft 10 and is fitted onto the shaft 10 via the insulating portion such that the conductive plate terminal 53 is positioned at the intermediate portion 70 between the wound mountain 35 and the terminal 42b. That is, it is only necessary that the conductive plate is not placed on the end surface of the core 20 but is positioned such that the conductive plate terminal 53 is positioned at a predetermined position. Similar to the above-described configuration, the rotor 3 with this configuration can enhance the reliability and the work efficiency of the rotor 3 while avoiding an interference between the conductive plate and the brush 4B and eventually can improve the productivity of the rotor 3.

The conductive plate 50 and the insulator 60 may be disposed to the core 20 on a side opposite to the commutator 40. This eliminates a possibility of the interference with the commutator 40, thereby increasing a degree of freedom in the location of the conductive plate terminals 53. Insert molding may be performed on the conductive plate 50, the insulator 60, and the commutator 40 integrally. In this case, the insulator 60, the support body 41, and the pressing member 44 are formed as an integrated resin component, enhancing the work efficiency during the assembly.

The above-described embodiment describes the core 20, the conductive plate 50, and the insulator 60 of the rotor 3 all of which have the outer shape with the three-fold rotational symmetry as the example. However, it is only necessary that the core 20, the conductive plate 50, and the insulator 60 at least have the outer shape with equal to or more than the three-fold rotational symmetry and therefore the shape is not limited to the above-described shape.

The above-described embodiment describes the example where the commutator terminals 42b and the winding wire 30 are bonded by the soldering and the conductive plate terminals 53 and the winding wire 30 are bonded by the TIG welding; however, the method (kind) of the thermal bonding is not limited to the above-described method. For example, both terminals 42b and 53 may be bonded by the identical bonding method (for example, the TIG welding).

Figure 15:
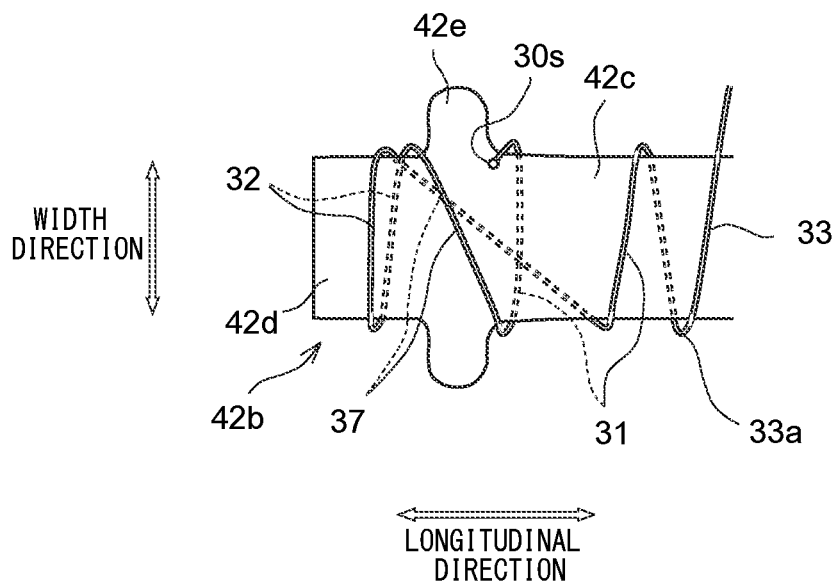
FIG. 15 is a schematic diagram illustrating a wound state of the winding wire around a commutator terminal (drawing viewed from an axial direction).

For example, as illustrated in FIG. 15, the winding wire 30 may be wound around the commutator terminal 42b and the fusion portion 42d may be welded from the distal end side for electrical connection. In this case as well, the above-described wound state where, for example, the crossing wire portion 37 is wound with the number of wires on the lower surface side being less than the number of wires on the top surface side and the winding wire 30 does not overlap at the fusion portion 42d may be employed. Reference numeral 30s in the drawing denotes a start wire portion (distal end) of the winding wire 30. In this example, the start wire portion 30s is positioned on the lock portion 42c; however, the start wire portion 30s may be disposed at the fusion portion 42d.

The molten ball, which is generated through the melting of the fusion portion 42d, may be positioned on the top surface side of the commutator terminal 42b. Furthermore, as the material of the fusion portion 42d of the commutator terminal 42b, a material (for example, the phosphor bronze) with a melting point lower than the material of the winding wire 30 (for example, the oxygen free copper) may be employed. In this case, the brush contact portion 42a of the commutator piece 42 may be formed of a clad material (a material formed by stacking a different copper alloy on the phosphor bronze as the base material). That is, the commutator terminal 42b (or the fusion portion 42d of the commutator terminal 42b) and other sites may be formed of different materials.

The connection method for the motor that applies the above-described structure of the electrical connection portion is not especially limited and may be a motor with brush by A connection method. In this case, the above-described coupling structure is applicable to the coupling portion of the commutator terminal and the winding wire. The motor that applies the above-described structure of the electrical connection portion may be a brushless motor. In this case, the above-described coupling structure is applicable to the coupling portion of the terminal of the stator around which the winding wire is wound (current-carrying component) and the winding wire.

[6. Additional Remarks]

A part of or all the above-described embodiment and modifications can be described as the following additional remarks.

(Additional Remark A-1)

A structure of an electrical connection portion is formed by thermal bonding of a terminal of a current-carrying component of a motor and a winding wire. The terminal includes a lock portion positioned on a base end side and a fusion portion positioned on a distal end side. The winding wire includes a main winding wire portion, a first winding wire portion as a non-heat bonded portion, and a second winding wire portion as a heat bonded portion of the motor. The winding wire is in a wound state at the main winding wire portion. The winding wire is disposed via a coupling wire portion with the main winding wire portion at the first winding wire portion. The winding wire is wound around the lock portion at a bearing power larger than a tension pulling the coupling wire portion to the main winding wire portion side at the first winding wire portion. The winding wire is wound around the fusion portion continuous with the first winding wire portion at the second winding wire portion.

(Additional Remark A-2)

With the structure of the electrical connection portion according to Additional Remark A-1, the terminal includes a difficult-to-melt portion having a property of being less likely to melt compared with the fusion portion at a base end side with respect to the fusion portion.

(Additional Remark A-3)

With the structure of the electrical connection portion according to Additional Remark A-2, the difficult-to-melt portion has a lateral cross-sectional area larger than the fusion portion.

(Additional Remark A-4)

With the structure of the electrical connection portion according to Additional Remark A-3, the difficult-to-melt portion includes a wide-width portion with a width formed wider than the fusion portion.

(Additional Remark A-5)

With the structure of the electrical connection portion according to Additional Remark A-3 or A-4, the difficult-to-melt portion includes a wall thickness portion formed thicker than the fusion portion.

(Additional Remark A-6)

With the structure of the electrical connection portion according to any one of Additional Remarks A-3 to A-5, the fusion portion includes a cut-out portion to configure a lateral cross-sectional area smaller than the difficult-to-melt portion.

(Additional Remark A-7)

With the structure of the electrical connection portion according to any one of Additional Remarks A-2 to A-6, the difficult-to-melt portion includes a different-material portion. The different-material portion is made of a material with a property of being less likely to melt compared with a material of the fusion portion.

(Additional Remark B-1)

In a structure of an electrical connection portion formed by thermal bonding of a terminal of a current-carrying component of a motor and a winding wire, the terminal includes a lock portion positioned on a base end side and a fusion portion positioned on a distal end side and thermally bonded, and a difficult-to-melt portion having a property of being less likely to melt compared with the fusion portion on a base end side with respect to the fusion portion. The winding wire includes a main winding wire portion, a first winding wire portion, and a second winding wire portion of the motor. The winding wire is in a wound state at the main winding wire portion. The first winding wire portion is disposed via a coupling wire portion in a state of acting a tension with the main winding wire portion and is wound around the lock portion. The second winding wire portion is disposed continuous with the first winding wire portion and is wound around the fusion portion.

(Additional Remark B-2)

With the structure of the electrical connection portion according to Additional Remark B-1, the difficult-to-melt portion has a lateral cross-sectional area larger than the fusion portion.

(Additional Remark B-3)

With the structure of the electrical connection portion according to Additional Remark B-2, the difficult-to-melt portion includes a wide-width portion with a width formed wider than the fusion portion.

(Additional Remark B-4)

With the structure of the electrical connection portion according to Additional Remark B-2 or B-3, the difficult-to-melt portion includes a wall thickness portion formed thicker than the fusion portion.

(Additional Remark B-5)

With the structure of the electrical connection portion according to any one of Additional Remarks B-2 to B-4, the fusion portion includes a cut-out portion to configure a lateral cross-sectional area smaller than the difficult-to-melt portion.

(Additional Remark B-6)

With the structure of the electrical connection portion according to any one of Additional Remarks B-1 to B-5, the difficult-to-melt portion includes a different-material portion. The different-material portion is made of a material with a property of being less likely to melt compared with a material of the fusion portion.

(Additional Remark C)

In a rotor, the terminal of the current-carrying component and the winding wire are coupled with the structure of the electrical connection portion according to any one of Additional Remarks A-1 to A-7 and Additional Remarks B-1 to B-6.

(Additional Remark D)

In a motor, the terminal of the current-carrying component and the winding wire are coupled with the structure of the electrical connection portion according to any one of Additional Remarks A-1 to A-7 and Additional Remarks B-1 to B-6.

DESCRIPTION OF REFERENCE SIGNS

1: Motor
3: Rotor
5, 5W, 5X, 5Y, 5Z, 5Z', 5Z": Terminal
5a: Lock portion
5b, 5b', 5b": Fusion portion
5d: Wall thickness portion (partition portion, difficult-to-melt portion)
5e: Different-material portion (partition portion, difficult-to-melt portion)
5f: Cut-out portion
5g: Stepped portion
5y: Molten ball
6: Winding wire
6a: First winding wire portion (binding portion)
6b: Second winding wire portion
6c: Coupling wire portion
6d: Main winding wire portion
6e: Root (one end portion)
30: Winding wire
30e: Terminal wire portion (distal end)
30s: Start wire portion (distal end)
31: First winding wire portion (binding portion)
32: Second winding wire portion
33: Coupling wire portion
34: Main winding wire portion
35: Wound mountain
36: Root (one end portion)
37: Crossing wire portion
40: Commutator (current-carrying component)
42b: Commutator terminal (terminal)
42c: Lock portion
42d: Fusion portion
42e: Wide-width portion (partition portion, difficult-to-melt portion)
50: Conductive plate (current-carrying component)
53, 53R, 53S, 53T, 53V, 53X: Conductive plate terminal (terminal)
53a, 53a', 53": Lock portion
53b, 53b', 53b', 53d: Fusion portion
53c: Wide-width portion (partition portion, difficult-to-melt portion)
53u: Top surface (other surface)
53w: Lower surface (one surface)
55: Molten ball
A: Range
B: Difficult-to-melt area
F1: Coupling tension (tension)
F2: Bearing power

What is claimed is:

1. A structure of an electrical connection portion formed by thermal bonding of a terminal of a current-carrying component of a motor and a winding wire, wherein:
the terminal includes:
a lock portion positioned on a base end side; and
a fusion portion positioned on a distal end side,
the winding wire includes:
a binding portion wound around the lock portion, the binding portion having one end portion coupled to a molten ball generated at the fusion portion; and
a coupling wire portion tightly stretched from a main winding wire portion of the motor disposed in a wound state and continuous to the other end portion of the binding portion, and
the one end portion of the binding portion is in a state where tension pulling the coupling wire portion to the main winding wire portion side does not act, and
wherein the binding portion after the thermal bonding is in a state in which a bearing power is acting to retain the wound state to the lock portion, the bearing power being larger than the tension.

2. The structure of the electrical connection portion according to claim 1, wherein
the terminal includes a partition portion, the partition portion partitioning the lock portion and the fusion portion, the partition portion maintaining the state of the bearing power being larger than the tension.

3. The structure of the electrical connection portion according to claim 2, wherein the molten ball is generated by a restriction of a progress by the partition portion during the thermal bonding of the winding wire from a distal end side of the terminal.

4. The structure of the electrical connection portion according to claim 2, wherein the partition portion has a lateral cross-sectional area larger than that of the lock portion.

5. The structure of the electrical connection portion according to claim 4, wherein the partition portion includes a wide-width portion with a width formed wider than the lock portion.

6. The structure of the electrical connection portion according to claim 4, wherein the partition portion includes a wall thickness portion formed thicker than the lock portion.

7. The structure of the electrical connection portion according to claim 4, wherein the fusion portion includes a cut-out portion to configure a lateral cross-sectional area smaller than the partition portion.

8. The structure of the electrical connection portion according to claim 2, wherein the partition portion includes a different-material portion, the different-material portion being made of a material with a property of being less likely to melt compared with a material of the molten ball.

9. The structure of the electrical connection portion according to claim 2, wherein:

the terminal includes the lock portion, the partition portion, and the fusion portion in an order from the base end side, the binding portion includes a crossing wire portion obliquely crossing the partition portion, and the crossing wire portion is disposed such that a count of wires along one surface of the terminal on the main winding wire portion side is less than the count of wires along the other surface on a side opposite to the one surface.

10. The structure of the electrical connection portion according to claim 9, wherein:

the current-carrying component includes a conductive plate around which the winding wire is wound together with a core of the motor, and the crossing wire portion is disposed only on the other surface side of the terminal of the conductive plate.

11. The structure of the electrical connection portion according to claim 9, wherein the molten ball is positioned on the other surface side of the terminal.

12. The structure of the electrical connection portion according to claim 1, wherein:

the current-carrying component includes the conductive plate around which the winding wire is wound together with a core of the motor, and in the coupling wire portion, both end portions of the coupling wire portion are positioned on a side identical to one another in a width direction perpendicular to a longitudinal direction connecting the base end side and the distal end side at the terminal of a conductive plate.

13. The structure of the electrical connection portion according to claim 1, wherein the winding wire has a distal end positioned at the fusion portion.

14. The structure of the electrical connection portion according to claim 1, wherein the winding wire is wound without an overlap with the fusion portion.

15. The structure of the electrical connection portion according to claim 1, wherein the fusion portion is made of the material with a melting point lower than that of a material of the winding wire.

16. The structure of the electrical connection portion according to claim 15, wherein the material of the fusion portion is a phosphor bronze, the material of the winding wire being an oxygen free copper.

17. A motor, comprising:
a terminal;
a current-carrying component;
a winding wire; and
a structure of an electrical connector, wherein the terminal of the current-carrying component and the winding wire are coupled with the structure of the electrical connector, wherein the terminal includes:
a lock positioned on a base end side; and
a fusion portion positioned on a distal end side, the winding wire includes:
a binder wound around the lock, the binder comprising one end coupled to a molten ball generated at the fusion portion; and
a coupling wire tightly stretched from a main winding wire of the motor disposed in a wound state and continuous to the other end of the binder, and the one end of the binder is in a state where tension pulling the coupling wire to the main winding wire side does not act, and wherein the binder after the thermal bonding is in a state in which a bearing power is acting to retain the wound state to the lock, the bearing power being larger than the tension.

18. A method for forming an electrical connection portion of a terminal of a current-carrying component and a winding wire, the current-carrying component including the terminal with a lock portion on a base end side and a fusion portion on a distal end side, the terminal being thermally bonded to the winding wire of a motor, the method comprising:

a winding of disposing a main winding wire portion, a first winding wire portion, and a second winding wire portion of the motor, the winding wire being in a wound state at the main winding wire portion, the winding wire being wound around the lock portion via a coupling wire portion with the main winding wire portion at the first winding wire portion, the winding wire being wound around the fusion portion continuous with the first winding wire portion at the second winding wire portion; and a bonding of melting the fusion portion to thermally bond the fusion portion to the second winding wire portion concurrently with or after the winding, wherein:

the winding winds the winding wire such that a bearing power of the first winding wire portion to the lock portion becomes larger than a tension pulling the coupling wire portion to the main winding wire portion side, and the bonding terminates the thermal bonding maintaining a state of the bearing power being larger than the tension.

* * * * *